(12) United States Patent
Zhang et al.

(10) Patent No.: US 11,650,736 B2
(45) Date of Patent: May 16, 2023

(54) SGL PROCESSING ACCELERATION METHOD AND STORAGE DEVICE

(71) Applicant: SHANGHAI STARBLAZE INDUSTRIAL CO., LTD., Shanghai (CN)

(72) Inventors: Ze Zhang, Chengdu (CN); Hao Cheng Huang, Chengdu (CN); Yi Lei Wang, Chengdu (CN)

(73) Assignee: SHANGHAI STARBLAZE INDUSTRIAL CO., LTD., Shanghai (CN)

( * ) Notice: Subject to any disclaimer, the term of this patent is extended or adjusted under 35 U.S.C. 154(b) by 0 days.

(21) Appl. No.: 17/785,104

(22) PCT Filed: Dec. 4, 2020

(86) PCT No.: PCT/CN2020/134090
§ 371 (c)(1),
(2) Date: Aug. 10, 2022

(87) PCT Pub. No.: WO2021/121054
PCT Pub. Date: Jun. 24, 2021

(65) Prior Publication Data
US 2023/0028997 A1    Jan. 26, 2023

(30) Foreign Application Priority Data
Dec. 17, 2019    (CN) .......................... 201911300669.1

(51) Int. Cl.
*G06F 3/06* (2006.01)

(52) U.S. Cl.
CPC ............ *G06F 3/0607* (2013.01); *G06F 3/061* (2013.01); *G06F 3/0679* (2013.01); *G06F 3/064* (2013.01)

(58) Field of Classification Search
None
See application file for complete search history.

(56) References Cited

U.S. PATENT DOCUMENTS

| | | | |
|---|---|---|---|
| 9,778,858 B1* | 10/2017 | Prasad | .................. G06F 3/0613 |
| 2005/0033874 A1* | 2/2005 | Futral | ..................... G06F 13/28 |
| | | | 710/22 |
| 2016/0291867 A1* | 10/2016 | Olcay | ..................... G06F 3/068 |
| 2016/0292100 A1* | 10/2016 | Olcay | ..................... G06F 13/28 |
| 2019/0370199 A1* | 12/2019 | Tomlin | ................. G06F 3/0659 |

(Continued)

OTHER PUBLICATIONS

Notification to Grant Patent Right for Invention issued in Chinese Application No. 201911300669.1; dated Oct. 27, 2021; 3 pgs.

(Continued)

*Primary Examiner* — Kevin Verbrugge
(74) *Attorney, Agent, or Firm* — Hauptman Ham, LLP

(57) ABSTRACT

Disclosed are the SGL processing acceleration method and the storage device. The disclosed SGL processing acceleration method includes: obtaining the SGL associated with the IO command; generating the host space descriptor list and the DTU descriptor list according to the SGL; obtaining one or more host space descriptors of the host space descriptor list according to the DTU descriptor of the DTU descriptor list; and initiating the data transmission according to the obtained one or more host space descriptors.

10 Claims, 12 Drawing Sheets

(56) References Cited

U.S. PATENT DOCUMENTS

2020/0089648 A1* 3/2020 Klein .................... G06F 3/0607
2020/0286277 A1* 9/2020 Vembu ................. G06F 12/084
2021/0240641 A1* 8/2021 Benisty ................ G06F 3/0659

OTHER PUBLICATIONS

First Office Action issued in Chinese Application No. 201911300669.1; dated Aug. 30, 2021; 8 pgs.
International Search Report issued in International Application No. PCT/CN2020/134090; dated Feb. 25, 2021; 6 pgs.

* cited by examiner

| Byte | Description |
|---|---|
| 15:00 | SGL descriptor 0 |
| 31:16 | SGL descriptor 1 |
| ...... | ...... |
| ((n*16)+15) : (n*16) | SGL descriptor n |

| Byte | Description | | |
|---|---|---|---|
| 14:00 | Specific to descriptor type | | |
| 15 | SGL identifier: the table below describes the definition of this field | | |
| | Bit | Description | |
| | 03:00 | SGL descriptor sub-type | |
| | 07:04 | SGL descriptor type | |

| Encode | Description |
|---|---|
| 0h | SGL data block descriptor |
| 1h | SGL bit bucket descriptor |
| 2h | SGL segment descriptor |
| 3h | SGL last tail segment descriptor |
| 4h | Keyed SGL data block descriptor |
| 5h-Eh | Reserve |
| Fh | Specific to manufacturer |

FIG. 5C

FIG. 10 (Internal storage → Memory)

SGL PROCESSING ACCELERATION METHOD AND STORAGE DEVICE

RELATED APPLICATIONS

The present application is a U.S. National Phase of International Application Number PCT/CN2020/134090, filed Dec. 4, 2020, and claims priority to Chinese Application Number 201911300669.1, filed Dec. 17, 2019.

TECHNICAL FIELD

The present application relates to data processing techniques, and in particular, to the SGL (Scatter-Gather List) acceleration processing accessing data method in the storage device and the storage device using the method.

BACKGROUND

FIG. 1A shows a block diagram of a solid-state storage device. The solid-state storage device 102 is coupled to a host, for providing a storage capability for the host. The host may be coupled to the solid-state storage device 102 by multiple means; the coupling means include, but not limited to, for example, SATA (Serial Advanced Technology Attachment), SCSI (Small Computer System Interface), SAS SCSI (Serial Attached SCSI), IDE (Integrated Drive Electronics), USB (Universal Serial Bus), PCIE (Peripheral Component Interconnect Express), NVMe (NVM Express), Ethernet, Fiber channel, wireless communication network, and the like, to connect the host and the solid-state storage device 102. The host may be an information-processing device capable of communicating with the storage device through the modes above, such as personal computers, tablets, servers, laptops, network switches, routers, cellular phones, and personal digital assistants. The storage device 102 includes an interface 103, a control unit 104, one or more NVM chips 105, and DRAM (Dynamic Random Access Memory) 110.

NAND flash memory, phase change memory, FeRAM (Ferroelectric RAM), MRAM (Magnetic Random Access Memory), RRAM (Resistive Random Access Memory), and the like are common NVMs.

The interface 103 may be adapted to exchange data with the host by means of, such as, SATA, IDE, USB, PCIE, NVMe, SAS, Ethernet, and Fiber channel, and the like.

The control unit 104 is used for controlling data transmission among the interface 103, the NVM chip 105, and the DRAM 110, and is further used for storage management, host logical address to the flash physical address mapping, erasing equilibrium, bad block management, etc. The control unit 104 may be implemented through multiple modes such as software, hardware, firmware, or combinations thereof, for example, the control unit 104 may be in the form of Field-programmable gate array (FPGA), Application Specific Integrated Circuit (ASIC), or combinations thereof. The control unit 104 may also include the processor or controller; software is executed in the processor or controller to operate the hardware of the control unit 104 for processing Input/Output (IO) commands. The control unit 104 may also be coupled to the DRAM 110 and can access data of the DRAM 110. Data of the FTL table and/or buffered IO command can be stored in the DRAM.

The control unit 104 includes a flash interface controller (or referred to as a medium interface controller, a flash channel controller); the flash interface controller is coupled to the NVM chip 105 and issues the command to the NVM chip 105 by following the interface protocol of the NVM chip 105 to operate the NVM chip 105 and receive the command execution result output from the NVM chip 105. The known NVM chip interface protocol includes "Toggle", "ONFI", etc.

The memory target (Target) is one or more logic units (LUN, Logic Unit) of the shared CE (Chip Enable) signal in the NAND flash memory package. The NAND flash memory package may include one or more dies (Die). Typically, the logic unit corresponds to the single die. The logic unit may include multiple planes (Plane). Parallel accessing can be performed on the multiple planes in the logic unit, while the multiple logic units in the NAND flash chip may execute commands and report status independently from each other.

Data is generally stored and read in pages on the storage medium. However, data is erased according in blocks. The block (also referred to as the physical block) includes multiple pages. The block includes multiple pages. The page (also referred to as the physical page) on the storage medium has a fixed size, for example, 17664 bytes. The physical page may also have other sizes.

In the storage device, FTL (Flash Translation Layer) is used for maintaining the mapping information from the logic address to the physical address. The logic address constitutes the storage space of the solid-state storage device perceived by upper-layer software such as the operating system. The physical address is the address of the physical storage unit used to access the solid-state storage device. In the related art, address mapping can also be implemented using the intermediate address form. For example, the logic address is mapped to the intermediate address and the intermediate address is further mapped to the physical address.

The table structure storing the mapping information from the logic address to the physical address is called the FTL table. The FTL table is the important metadata in the storage device. The data item of the FTL table records the address mapping relationship in the unit of data unit in the storage device.

NVMe protocol 1.4 version provides the solution of using the memory (the memory) of the host by the storage device. The host memory used by the storage device is called HMB (Host Memory Buffer).

FIG. 1B shows the schematic diagram of the HMB.

HMB is the storage space used by the storage device using the host memory (for example, the memory). By using HMB, the storage device 102 may eliminate DRAM 110 to further reduce the cost. There are other modes of using HMB without eliminating DRAM 110.

According to the NVMe protocol, the storage device may apply to the host to use the HMB. The distribution of the HMB in the host memory may be discrete rather than continuous, and the Host Memory Descriptor List (HMBDL for short) is used to describe the addresses of one or more storage blocks used by the host to provide the HMB.

The item of Host Memory Descriptor List describes one storage block provided by the host for the HMB, including the start address of the storage block and the size of the storage block, so that the size of the storage block described by each item of Host Memory Descriptor List may be different. All storage blocks described by Host Memory Descriptor List together constitute the HMB provided by the host to the storage device.

FIG. 2 shows the schematic diagram of the HMB and HMBDL.

As an example, the host provides to the storage device a total of 64 KB of HMB, and HMB is provided by 4 storage blocks together. In FIG. 2, the size of the storage block 0 is 16 KB, the size of the storage block 1 is 32 KB, the size of the storage block 2 is 4 KB, and the size of the storage block 3 is 12 KB; the 4 storage blocks together provide the storage space of the size of 64 KB. The HMBDL includes 4 items (HMBDL item 0, HMBDL item 1, HMBDL item 2, and HMBDL item 3); each item separately records the start address and size of one of the corresponding storage blocks. Hence, through HMBDL, the storage device knows the HMB provided by the host and can use the HMB.

The control unit of the storage device needs to use the HMB. Generally, the control unit has its own address space, and by accessing the address space, each unit of the memory or control unit is used. The address space of the control unit is different from the address space of the host. To use the HMB, the control unit needs to establish the mapping relationship between its own address space and the address space of the host, so that the control unit can use the HMB in a manner of using its own address space or the similar manner.

Also referring to FIG. 2, the control unit uses the control unit address space (from the control unit address 0 to control unit 64 KB-1) to access the HMB; moreover, FIG. 2 also shows the correspondence between the control unit address space and each storage block described by the same HMBDL. The address range of 0 to 16 KB-1 in the address space of the control unit is mapped to the storage block 0; the address range of 16 KB to 48 KB-1 of the address space of the control unit is mapped to the storage block 1; the address range of 48 KB to 52 KB-1 of the control unit address space is mapped to the storage block 2; the address range of 52 KB to 64 KB-1 of the address space of the control unit is mapped to the storage block 3. Moreover, the address space of the control unit in each storage block is linearly mapped.

To use the address in the address space of the control unit to access the HMB, the control unit needs to traverses the HMBDL to calculate the host address. For example, if the storage device needs to access the address of the address space of the control unit at 60 KB, the following steps are used to obtain the host address:

(1) accessing a first item (for example, HMBDL item 0 in FIG. 2) of the HMBDL, to obtain the corresponding storage block 0 has a size of 16 KB, if less than 60 KB, which indicates that the address 60 KB of the address space of the control unit to be accessed does not fall within the address range of the storage block 0;

(2) accessing a next item (for example, HMBDL item 1 in FIG. 2) of the HMBDL, to obtain the corresponding storage block 1 has a size of 32 KB, and accumulating the sizes of the accessed storage blocks, 16+32=48 KB<60 KB, which indicates that the address 60 KB of the address space of the control unit to be accessed does not fall within the address range of the storage block 1;

(3) accessing a further next item (for example, HMBDL item 2 in FIG. 2) of the HMBDL, to obtain the size of the corresponding storage block 2 to be 4 KB, and accumulating the sizes of the accessed storage blocks as 52 KB (<60 KB), which indicates that the address 60 KB of the address space of the control unit to be accessed does not fall within the address range of the storage block 2;

(4) accessing a further next item (for example, HMBDL item 3 in FIG. 2) of the HMBDL, to obtain the size of the corresponding storage block 3 to be 12 KB, and accumulating the sizes of the accessed storage blocks as 64 KB (>60 KB), which indicates that the address 60 KB of the address space of the control unit to be accessed falls within the address range of the storage block 3;

(5) obtaining the start address of the storage block 3 from the obtained HMBDL item 3 as the base address, subtracting the addresses of all storage blocks that have been traversed (16+32+4=52 KB) from the address of the address space of the control unit to be accessed (60 K), to obtain 8 KB as the offset value, and adding the offset value to the base address to obtain the host address accessing the HMB.

The Scatter Gather List (SGL) describes the discrete data buffer and is used for describing data to be transmitted between information processing devices. For example, the IO command according to the NVMe protocol can use SGL to describe the data buffer of the host and the logic address of the storage device corresponding to the data.

SUMMARY

In order to use the HMB, each time when accessing the HMB, it needs to traverse one or more items of the HMBDL and calculate the host address. In the worst case, the host address corresponding to the address of the address space of the same control unit to be accessed could only be obtained by traversing the entire HMBDL; which leads to the low access efficiency, and inconsistent in the access delay of the HMB. In the case that the HMB space is larger and/or the storage blocks providing the HMB are large in number, the access efficiency of HMB become worse. It is desired to solve the problems of accessing HMB found above.

The present application provides a new solution for the control unit to access the HMB, improving the efficiency of accessing HMB and shortening the access time of the HMB.

The SGL has a relatively complex structure, which brings complexity for the analysis of the SGL. When the data block associated with the specific logic address is to be transmitted, it requires to traverse the SGL to find the corresponding SGL descriptor to initiate the data transmission; the traversing complexity of SGL is generally O(N) (N is the length of the linked list or the number of the descriptors in the SGL); when the SGL is long, traversing the SGL also introduces a large processing delay, which affects the performance of the storage device to process the IO command.

According to the embodiments of the present application, it desires to reduce the complexity of addressing data described by the SGL, to reduce the processing delay of the IO command.

According to the first aspect of the present application, the first method of rapid accessing the host memory buffer according to the first aspect of the present application is provided, which specifically includes the following steps: in response to accessing the host memory buffer, obtaining the address of the address space of the control unit; according to the address of the address space of the control unit, obtaining the item number and the offset value of the corresponding mapping table; according to the item number, obtaining the start address of the corresponding storage small block;

according to the combination of the start address and the offset value of the storage small block, obtaining the host address corresponding to the address of the address space of the control unit, and using the address to access the host memory buffer.

According to the first method of rapid accessing the host memory buffer in the first aspect of the present application, the second method of rapid accessing the host memory buffer according to the first aspect of the present application is provided, which further includes: establishing the mapping table at the initialization stage; and recording the host address corresponding to the address of the address space of the control unit in the item of the mapping table.

According to the first or second method of rapid accessing the host memory buffer in the first aspect of the present application, the third method of rapid accessing host memory buffer according to the first aspect of the present application is provided, which includes: the mapping table includes multiple items; according to the size described by the size of the memory page, determining the size of the address space of the control unit corresponding to each item in the mapping table.

According to the third method of rapid accessing the host memory buffer in the first aspect of the present application, the fourth method of rapid accessing the host memory buffer according to the first aspect of the present application is provided, which includes: according to the size described by the size of the memory page and the size of the host memory buffer provided by the host, determining the item number of the mapping table.

According to any one of the first to fourth method of rapid accessing the host memory buffer in the first aspect of the present application, the fifth method of rapid accessing the host memory buffer in the first aspect of the present application is provided, which includes: the host memory buffer includes multiple storage blocks; according to the size of the memory page, each storage block is divided into one or more storage small blocks, the size of each storage small block is the size of the memory page.

According to any one of the first to third method of rapid accessing the host memory buffer in the first aspect of the present application, the sixth method of rapid accessing the host memory buffer in the first aspect of the present application is provided, wherein the item number in the mapping table is the same as the number of the divided storage small blocks of the storage block in the host memory buffer.

According to any one of the first to sixth method of rapid accessing the host memory buffer in the present application, the sixth method of rapid accessing the host memory buffer in the first aspect of the present application is provided, wherein each item of the mapping table indicates the mapping relationship between the address of the address space of the control unit and the storage small block, so that each item records the address of the host address space of the storage small block corresponding to the item.

According to any one of the first to seventh method of rapid accessing the host memory buffer in the first aspect of the present application, the eighth method of rapid accessing the host memory buffer in the first aspect of the present application is provided, wherein the mapping table is recorded in the internal memory of the control unit or recorded in the dynamic random-access memory coupled to the control unit.

According to the eighth method of rapid accessing the host memory buffer in the first aspect of the present application, the ninth method of rapid accessing the host memory buffer according to the first aspect of the present application is provided, which includes: by searching a certain item of the mapping table, obtaining the address of the storage small block in the host address space corresponding to the item, and using the queried address of the storage small block in the host address space to access the host memory buffer.

According to the eighth method of rapid accessing the host memory buffer in the first aspect of the present application, the tenth method of rapid accessing the host memory buffer according to the first aspect of the present application is provided, which includes: by searching a certain item of the mapping table, obtaining a start address of the storage small block in the host address space corresponding to the item, and adding the start address with the offset value to obtain the address in the host address space to be accessed so as to access the host memory buffer.

According to any one of the first to tenth method of rapid accessing the host memory buffer in the first aspect of the present application, the eleventh method of rapid accessing the host memory buffer in the first aspect of the present application is provided, which includes: dividing the address of the address space of the control unit by the size of the memory page, the quotient obtained is the item number, and the remainder is used as the offset value.

According to the eleventh method of rapid accessing the host memory buffer in the first aspect of the present application, the twelfth method of rapid accessing the host memory buffer in the first aspect of the present application is provided, which includes: using the specific bit of the address of the address space of the control unit as the item number, and using other bits as the offset values.

According to the second aspect of the present application, the first storage device according to the second aspect of the present application is provided, comprising a control unit and a nonvolatile storage medium, wherein the control unit performs the method of the first aspect.

According to the third aspect of the present application, the first SGL processing acceleration method according to the third aspect of the present application is provided, which includes: obtaining an SGL associated with an IO command; generating a host space descriptor list and a DTU descriptor list according to the SGL; obtaining one or more host space descriptors of the host space descriptor list according to a DTU descriptor of the DTU descriptor list; and initiating the data transmission according to the obtained one or more host space descriptors.

According to the first SGL processing acceleration method of the third aspect of the present application, the second SGL processing acceleration method according to the third aspect of the present application is provided, wherein the host space descriptor list includes a plurality of host space descriptors; and each of the plurality of host space descriptors records the host memory address and length, and has the same size.

According to the second SGL processing acceleration method of the third aspect of the present application, the third SGL processing acceleration method according to the third aspect of the present application is provided, wherein the plurality of host space descriptors are continuously stored in the memory.

According to the second or third SGL processing acceleration method of the third aspect of the present application, the fourth SGL processing acceleration method according to the third aspect of the present application is provided, wherein the plurality of host space descriptors of the host space descriptor list are divided into a plurality of groups; the DTU descriptor of the DTU descriptor list indexes a group of host space descriptors; and a sum of the lengths recorded by all host space descriptors of the group of host space descriptors is equal to the length of the DTU.

According to the fourth SGL processing acceleration method of the third aspect of the present application, the fifth SGL processing acceleration method according to the third aspect of the present application is provided, which includes: according to one or more consecutive SGL descriptors in the SGL, generating the group of host space descriptors, wherein the size of the host memory space indicated by the one or more consecutive SGL descriptors is greater than or equal to the length of the DTU; and if the size of the host memory space indicated by the one or more consecutive SGL descriptors is greater than the length of the DTU, dividing the host memory space indicated by the last SGL descriptor of the one or more consecutive SGL descriptors, so that the size of the host memory space indicated by the one or more consecutive SGL descriptors is equal to the length of the DTU.

According to the fifth SGL processing acceleration method of the third aspect of the present application, the sixth SGL processing acceleration method according to the third aspect of the present application is provided, which includes: if the size of the host memory space indicated by the one or more consecutive SGL descriptors is greater than the length of the DTU, using the remaining host memory space of the last SGL descriptor that is divided and exceeds the length of the DTU as the host memory space described by the next new SGL descriptor.

According to one of the first to fourth SGL processing acceleration methods of the third aspect of the present application, the seventh SGL processing acceleration method according to the third aspect of the present application is provided, which includes: obtaining the first SGL descriptor from the SGL; obtaining the size of the remaining host DTU space corresponding to the first SGL descriptor; and if the size of the remaining host DTU space corresponding to the first SGL descriptor is less than the size of the DTU, generating a host space descriptor according to the first SGL descriptor, wherein the generated host space descriptor indicates all the remaining host DTU space corresponding to the first SGL descriptor.

According to the seventh SGL processing acceleration method of the third aspect of the present application, the eighth SGL processing acceleration method according to the third aspect of the present application is provided, which includes: if the size of the remaining host memory space corresponding to the first SGL descriptor is equal to the size of the DTU, generating a host space descriptor according to the first SGL descriptor, wherein the generated host space descriptor indicates the host memory space equal to the size of the DTU.

According to the eighth SGL processing acceleration method of the third aspect of the present application, the ninth SGL processing acceleration method according to the third aspect of the present application is provided, which further includes: generating the host space descriptor for the next host DTU space and obtaining the next SGL descriptor from the SGL.

According to one of the seventh to ninth SGL processing acceleration methods of the third aspect of the present application, the tenth SGL processing acceleration method according to the third aspect of the present application is provided, which includes: if the size of the remaining host memory space corresponding to the first SGL descriptor is greater than the size of the DTU, generating a host space descriptor according to the first SGL descriptor, wherein the generated host space descriptor indicates the host memory space equal to the size of the DTU.

According to the tenth SGL processing acceleration method of the third aspect of the present application, the eleventh SGL processing acceleration method according to the third aspect of the present application is provided, which includes: generating the host space descriptor for the next host DTU space to obtain the size of the remaining host DTU space corresponding to the first SGL descriptor.

According to the seventh to eleventh SGL processing acceleration methods of the third aspect of the present application, the twelfth SGL processing acceleration method according to the third aspect of the present application is provided, which includes: if the remaining host DTU space corresponding to the first SGL descriptor is less than the size of the DTU, in response to generating the host space descriptor according to the first SGL descriptor, further obtaining the size of the currently remaining host DTU space, obtaining a second SGL descriptor from the SGL, and obtaining a size of a remaining host DTU space corresponding to the second SGL descriptor; and if the size of the remaining host DTU space corresponding to the second SGL descriptor is less than the size of the DTU, generating a host space descriptor according to the second SGL descriptor, wherein the generated host space descriptor indicates all the remaining host DTU space corresponding to the second SGL descriptor.

According to the twelfth SGL processing acceleration method of the third aspect of the present application, the thirteenth SGL processing acceleration method according to the third aspect of the present application is provided, which further includes: further obtaining a new second SGL descriptor from the SGL.

According to the twelfth or thirteenth SGL processing acceleration method of the third aspect of the present application, the fourteenth SGL processing acceleration method according to the third aspect of the present application is provided, which further includes: if the size of the remaining host DTU space corresponding to the second SGL descriptor is equal to the size of the DTU, according to the second SGL descriptor, generating the host space descriptor, wherein the generated host space descriptor indicates the host memory space equal to the size of the DTU.

According to the fourteenth SGL processing acceleration method of the third aspect of the present application, the fifteenth SGL processing acceleration method according to the third aspect of the present application is provided, which further includes: generating the host space descriptor for the next host DTU space, and obtaining the next SGL descriptor from the SGL.

According to the twelfth to fifteenth SGL processing acceleration methods of the third aspect of the present application, the sixteenth SGL processing acceleration method according to the third aspect of the present application is provided, which further includes: if the size of the remaining host DTU space corresponding to the second SGL descriptor is greater than the size of the DTU, according to the second SGL descriptor, generating the host space descriptor, wherein the generated host space descriptor indicates the host memory space equal to the size of the DTU.

According to the sixteenth SGL processing acceleration method of the third aspect of the present application, the seventeenth SGL processing acceleration method according to the third aspect of the present application is provided, which further includes: generating the host space descriptor for the next host DTU space to obtain the size of the remaining host DTU space corresponding to the second SGL descriptor.

According to the first to seventeenth SGL processing acceleration methods of the third aspect of the present application, the eighteenth SGL processing acceleration method according to the third aspect of the present application is provided, wherein the DTU descriptor list includes the plurality of DTU descriptors; and each of the plurality of DTU descriptors records the host space descriptor address and number, and has the same size.

According to the eighteenth SGL processing acceleration method of the third aspect of the present application, the nineteenth SGL processing acceleration method according to the third aspect of the present application is provided, wherein the plurality of DTU descriptors are continuously stored in the memory.

According to the eighteenth or nineteenth SGL processing acceleration method of the third aspect of the present application, the twentieth SGL processing acceleration method according to the third aspect of the present application is provided, wherein the plurality of DTU descriptors in the DTU descriptor list are associated with the continuous logic address space accessed by the IO command in sequence.

According to the first to twentieth SGL processing acceleration methods of the third aspect of the present application, the twenty-first SGL processing acceleration method according to the third aspect of the present application is provided, which includes: traversing the host space descriptor list from front to back; every time when obtaining one or more host space descriptors with the size of the corresponding host memory being equal to the size of the DTU, grouping the one or more host space descriptors, and generating a DTU descriptor for the group, wherein the generated DTU descriptor records a first address of the group of host space descriptors, and the DTU descriptor further records the number of the group of host space descriptors or the length of the occupied storage space.

According to the first to seventeenth SGL processing acceleration methods of the third aspect of the present application, the twenty-second SGL processing acceleration method according to the third aspect of the present application is provided, which includes: if one or more SGL descriptors in the SGL indicates a bit bucket, setting a bit bucket mark in the host space descriptor generated according to the one or more SGL descriptors.

According to the first to twenty-second SGL processing acceleration methods of the third aspect of the present application, the twenty-third SGL processing acceleration method according to the third aspect of the present application is provided, which includes: if the one or more host space descriptors in the host space descriptor list obtained according to the DTU descriptor in the DTU descriptor list have a bit bucket mark, not initiating data transmission according to each obtained host space descriptor with the bit bucket mark.

According to the first to twenty-third SGL processing acceleration methods of the third aspect of the present application, the twenty-fourth SGL processing acceleration method according to the third aspect of the present application is provided, wherein a host memory address indicated by the host space descriptor is used as an end of data transmission, while a DTU corresponding to the DTU descriptor indexing the host space descriptor is used as an end of the data transmission.

According to the first to twenty-fourth SGL processing acceleration methods of the third aspect of the present application, the twenty-fifth SGL processing acceleration method according to the third aspect of the present application is provided, wherein if the IO command is a read command, by the initiated data transmission, moving the DTU data in a memory of a storage device corresponding to the DTU descriptor indexing the host space descriptor, to the host memory represented by the host memory address indicated by the host space descriptor.

According to the first to twenty-fifth SGL processing acceleration methods of the third aspect of the present application, the twenty-sixth SGL processing acceleration method according to the third aspect of the present application is provided, wherein if the IO command is a write command, by the initiated data transmission, moving the data in the host memory represented by the host memory address indicated by the host space descriptor, to the DTU in the memory of the storage device corresponding to the DTU descriptor indexing the host space descriptor.

According to the fourth aspect of the present application, the first storage device according to the fourth aspect of the present application is provided, comprising a control unit and a nonvolatile storage medium, wherein the control unit performs one of the SGL processing acceleration methods of the third aspect of the present application.

BRIEF DESCRIPTION OF THE DRAWINGS

To describe the technical solutions in the embodiments of the present application or the prior art more clearly, the accompanying drawings required for describing the embodiments or the prior art are briefly described hereinafter. Apparently, the accompanying drawings in the following description only relate to some embodiments of the present application, and a person of ordinary skill in the art may obtain other accompanying drawings from these accompanying drawings.

FIG. 5C shows the schematic diagram of the SGL descriptor type.

DETAILED DESCRIPTION

The following clearly and completely describes the technical solutions in the embodiments of this application with reference to the accompanying drawings in the embodiments of this application. Apparently, the described embodiments are some rather than all the embodiments of this application. All other embodiments obtained by a person skilled in the art based on the embodiments of this application without creative efforts shall fall within the protection scope of this application.

Figure 1A:
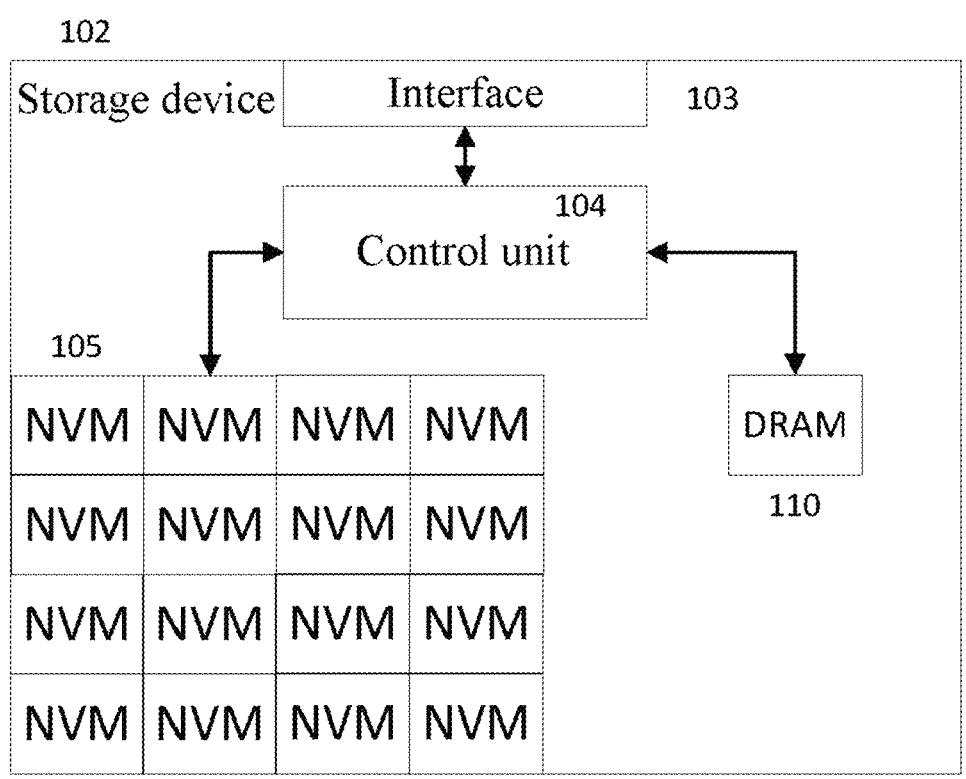
FIG. 1A is the block diagram of the solid-state storage device of the prior art.
Figure 1B:
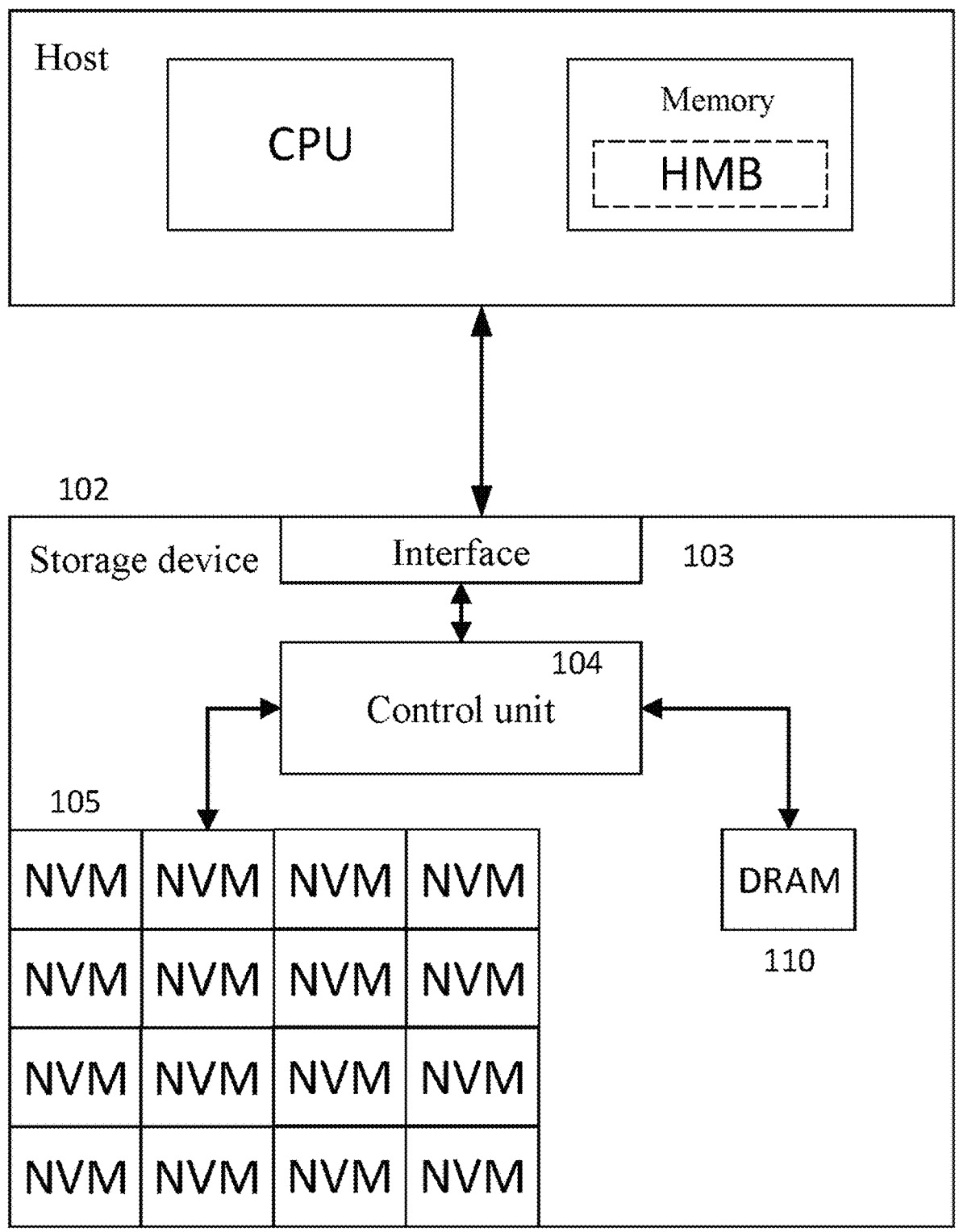
FIG. 1B is the schematic diagram of the HMB in the prior art.
Figure 2:
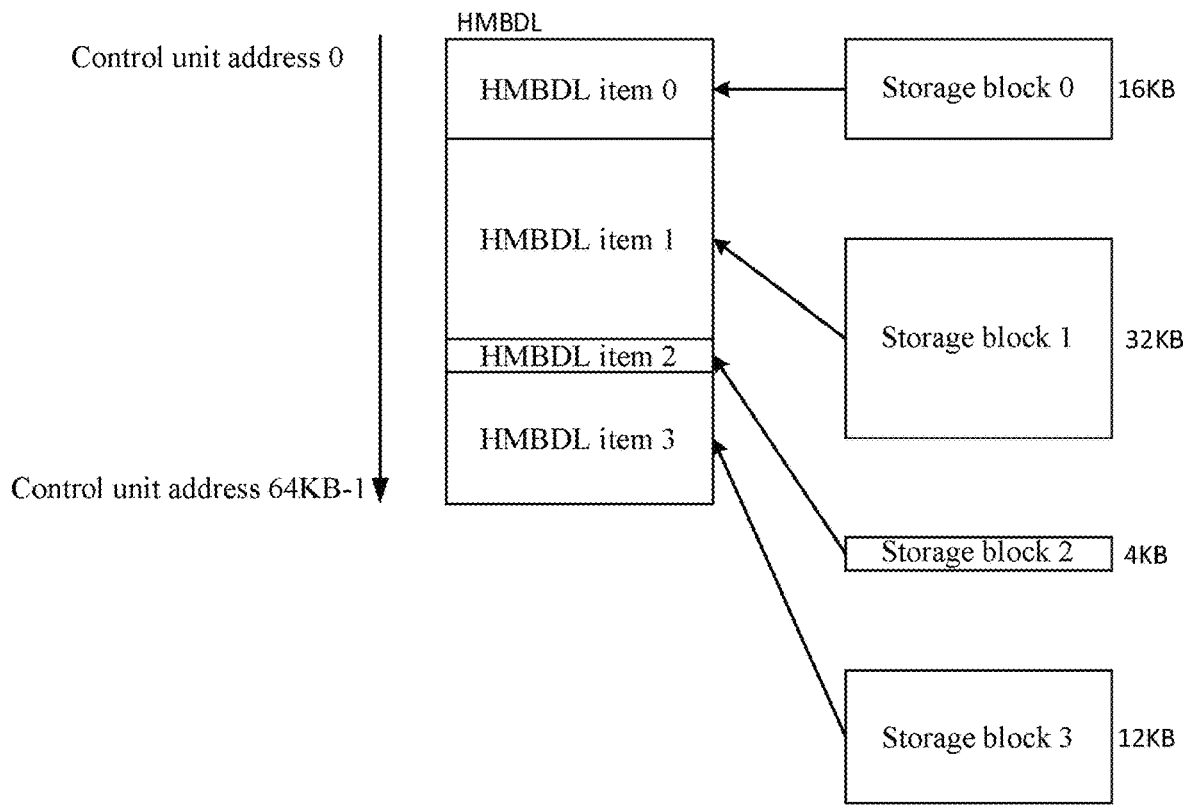
FIG. 2 is the schematic diagram of the mapping between the HMB and HMBDL in the prior art.
Figure 3:
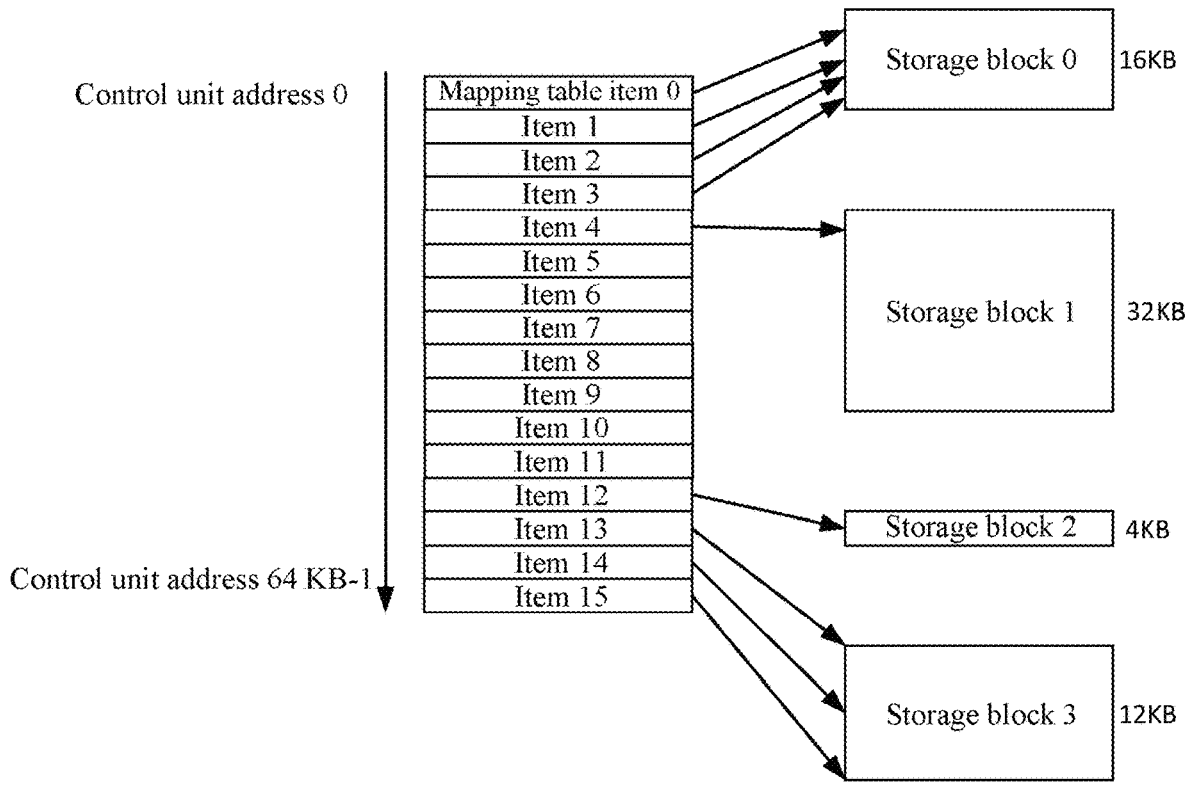
FIG. 3 is the schematic diagram of the mapping of the control unit address space to the host address space of the embodiment of the present application.

FIG. 3 shows the schematic diagram of the mapping of the control unit address space to the host address space of the embodiment of the present application.

With reference to the embodiment of FIG. 3, by creating the mapping table, the direct mapping relation between the control unit address space and the host address space is established. The mapping table is established according to the HMBDL; after obtaining the mapping table, according to the address of the control unit address space, the mapping table is searched; the host address corresponding to the address of the same control unit address space is recorded in the found mapping table item. Hence, no matter what the value of the address of the control unit address space to be accessed is, the delay for searching the mapping table is consistent, i.e., the time for accessing the mapping table.

The mapping table includes multiple items. The mapping table shown in FIG. 3 includes item 0, item 1, . . . , and item 15, 16 items in total. The size of the same control unit address space corresponding to the item of the mapping table is determined according to the size described according to CC.MPS (the memory page size) of the NVMe protocol. As an example, the memory page size described by CC.MPS is 4 KB, and then the mapping table is created according to each item representing the space of 4 KB. Moreover, according to the size of the HMB provided by the host, the item number of the mapping table is determined. For example, when the size of the HMB is 64 KB, the mapping table needs 16 items (64/4=16).

All storage blocks provided to the HMB by the host are also divided according to the size described by the CC.MPS, and are divided into multiple storage small blocks. CC.MPS describes the minimum memory allocation unit, so that the sizes of all storage blocks provided to the HMB by the host are necessarily the integer times of the CC.MPS. By traversing the HMBDL, all the storage blocks provided to the HMB by the host are obtained, and each storage block is divided into storage small blocks.

As an example, also referring to FIG. 3, the HMB includes storage block 0, storage block 1, storage block 2, and storage block 3. The size of the storage block 0 is 16 KB, the size of the memory page described by the CC.MPS is 4 KB, and then the storage block 0 is divided into 4 storage small blocks that are continuously arranged; the storage small block 0 in the host address space is located in a range starting from the start address of the storage block 0 and extending backwards by 4 KB (the size of the memory page described by the CC.MPS); the storage small block 1 in the host address space is located in a range starting from the start address of the storage block 0 extending backwards by 4 KB to the start address of the storage block 0 extending backwards by 8 KB (i.e., the range starting from the end of the storage small block 0 and extending backwards by 4 KB); the rest may be deduced by analogy; the storage small block 2 in the host address space is located in a range starting from the start address of the storage block 0 extending backwards by 8 KB to the start address of the storage block 0 extending backwards by 12 KB. The storage block 1 is divided into 8 storage small blocks (storage small block 4 to storage small block 11). Similarly, the storage block 3 is divided into 3 storage small blocks, which respectively are storage small block 13, storage small block 14, and storage small block 15. As can be understood, the storage small block 4 in the host address space is located in a range starting from the start address of the storage block 1 and extending backwards by 4 KB; the storage small block 13 in the host address space is located in a range starting from the start address of the storage block 3 and extending backwards by 4 KB.

Hence, the item number of the mapping table is the same as the number of the storage small blocks divided from the storage blocks provided to the HMB by the host. For example, referring to FIG. 3, one-to-one correspondence exists among 15 items of the mapping table and 15 storage small blocks. To establish the mapping table, in each item of the mapping table, the address of the host address space of the storage small block corresponding thereto is recorded. Hence, the i-th item of the mapping table indicates the mapping relation between the address i*CC.MPS of the control unit address space and the storage small block i, while the i-th item records the address of the storage small block i in the host address space.

The establishing of the mapping table occurs in an initialization stage of the control unit; the mapping table is created according to the information described by the HMBDL and CC.MPS. The mapping table is recorded in the memory inside the control unit or is recorded in, for example, the DRAM 110 coupled to the same control unit. After establishing the mapping table, unless the host updates the HMBDL, no more amendment is generally needed. Moreover, using the mapping table to accelerate the address conversion process from the control unit address space to the host address space.

Therefore, when the control unit desires to access the address i*CC.MPS of the control unit address space provided by the HMB, by searching the i-th item of the mapping table, the address of the storage small block i in the host address space is obtained and the obtained address of the storage small block i in the host address space is used for accessing the HMB. As another example, when the control unit desires to access the address i*CC.MPS+offset (offset represents the offset, 0<offset<4 K) of the control unit address space provided by the HMB, by searching the i-th item of the mapping table, the start address of the storage small block i (marked as Ai) in the host address space is obtained and then Ai+offset is used for obtaining the address to be accessed in the host address space for accessing the HMB.

Figures 4, 5A, 5B:
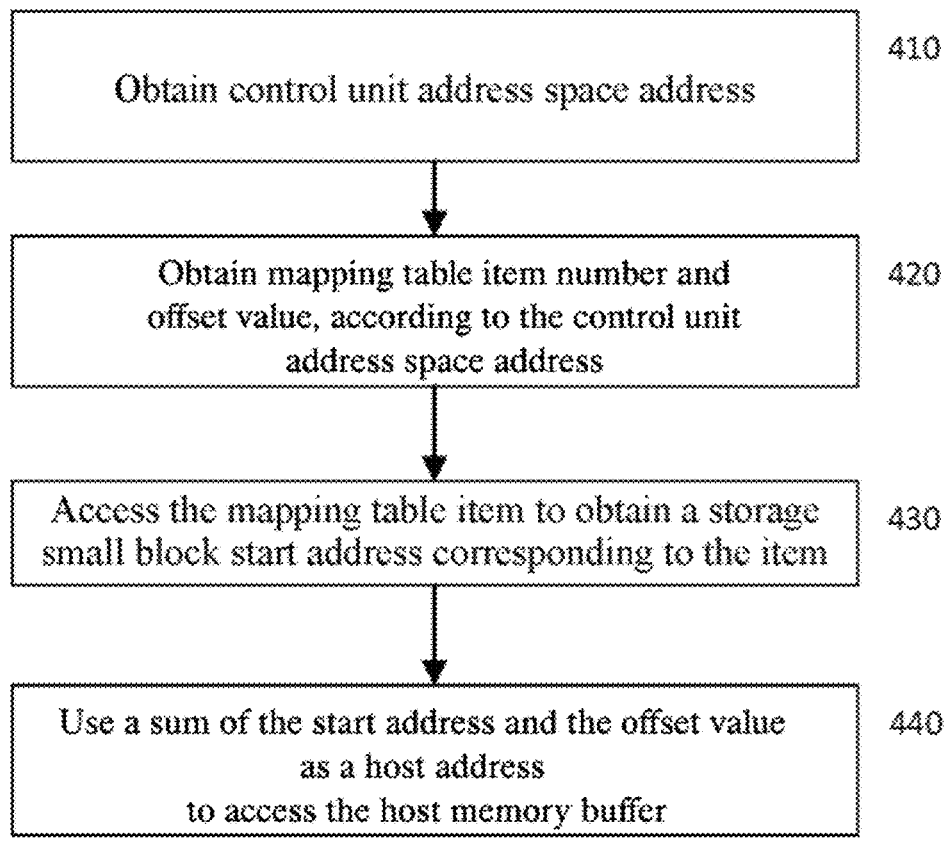
FIG. 4 is the flow chart of converting the control unit address space address to the host address space address according to the embodiment of the present application.
FIG. 5A shows the schematic diagram of the SGL segment in the NVMe protocol.
FIG. 5B shows the schematic diagram of the SGL descriptor.

FIG. 4 shows the flow chart of converting the control unit address space address to the host address space address according to the embodiment of the present application.

As an example, the control unit wishes to access the HMB. The HMB of 64 KB is mapped to the range of 64 KB of the control unit address space. The control unit accesses the address space of 64 KB of the control unit address space to use the HMB.

To access the HMB, the control unit obtains the address of the control unit address space (marked as CA) (410). The corresponding mapping table item number i and offset value are obtained according to the address CA of the control unit address space (420). For example, divide CA by CC.MPS, the quotient obtained is number i, and the remainder is used as the offset value. For another example, the specific bit (for example, low-4 bit, middle-4 bit, or high-4 bit) of the CA is taken as the number i, while other bits are used as the offsets.

The mapping table is searched; the start address A of the storage small block i is obtained from the value recorded in the mapping table item i (430); the start address A is the address of the host space. The start address A and the offset are further added to obtain the host address corresponding to the address CA of the address space of the control unit, and the address is used for accessing the HMB (440).

According to the embodiment of the present application, the conversion time from the address of the control unit address space to the host address can be greatly reduced and the efficiency for the control unit to access the HMB is improved.

The SGL describes the discrete data buffer and is used for describing data between information processing devices. For example, according to the IO command of the NVMe protocol, the SGL can be used for describing the data buffer of the host and the logic address of the storage device corresponding to the same data.

The SGL includes one or more SGL segments. FIG. 5A shows the schematic diagram of the SGL segment in the NVMe protocol. The SGL segment includes one or more SGL descriptors; each SGL descriptor has the fixed size (for example, 16 bytes).

FIG. 5B shows the schematic diagram of the SGL descriptor. The SGL descriptor includes the SGL identifier and content part changing dependent on the descriptor type (FIG. 5B shows the "descriptor type specific" field).

FIG. 5C shows the schematic diagram of the SGL descriptor type. The SGL descriptor includes multiple types, each having the specific type.

Generally, the SGL descriptor describes the address and length of the data buffer. In the NVMe protocol, the data buffer described by the SGL descriptor is located in the memory of the device issuing the IO command (for example, the host).

Figure 6:
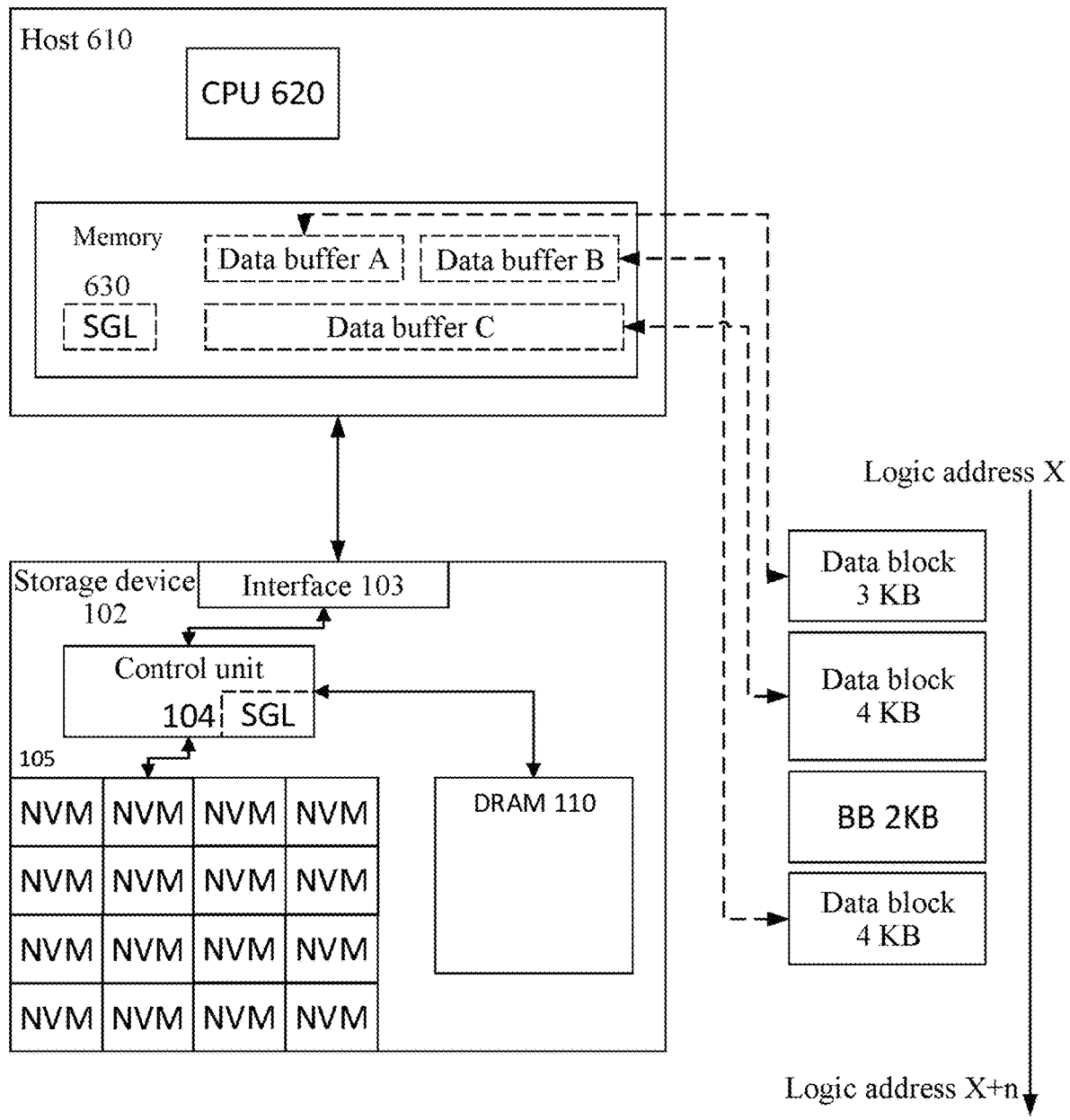
FIG. 6 shows the schematic diagram of the data transmission according to the SGL in the prior art.

FIG. 6 shows the schematic diagram of data transmission according to the SGL of the prior art.

The host 610 is coupled to the storage device 102. The host includes the CPU 620 and the memory 630. The host 610 prepares the SGL and one or more data buffers for providing the IO command to the storage device 102 (FIG. 6 shows the data buffer A, data buffer B, and data buffer C); the data buffer is the storage block in the host memory 630. The data buffer is used for carrying data associated with the IO command. If the IO command is the write command, data to be written into the storage upper device 102 is stored in the data buffer; if the IO command is the read command, the data read by the storage device 102 would be moved to the data buffer.

The data buffer is discrete, and includes one or more data buffer blocks (storage blocks); these buffers respectively have same or different sizes and are located at any position of the memory 630. The SGL describes the one or more data buffer blocks used by the same IO command, so that the storage device obtains the SGL according to the IO command, to know the data buffer of the IO command.

The IO command also describes the logic address and length of the storage device. As an example, the IO command indicates the start logic address (X) to be accessed and the data length (n).

In the example in FIG. 6, the SGL includes 4 segments, respectively describing that 3 KB data starting from the logic address X is associated with the data buffer block A, 4 KB data following the logic address is associated with the data buffer block C, 2 KB data following the logic address belonging to the bit bucket (not associated with any data buffer block), and 4 KB data following the logic address is associated with the data buffer block B.

To process the IO command, the control unit of the storage device 102 obtains the SGL from the host 610, and data is moved between the data buffer of the host memory and the storage device according to the SGL.

If the IO command is the write command, according to the SGL, the storage device 102 writes the data buffer block A of the host memory 630 into the 3 KB storage space starting from the logic address X, writes the data buffer block B into the 4 KB storage space starting from the logic address X+9 KB, and writes the data buffer block C into the 4 KB storage space starting from the logic address X+3 KB.

If the IO command is the read command, according to the SGL, the storage device 102 moves the 3 KB data starting from the logic address X to the data buffer block A of the host memory 630, moves the 4 KB data block starting from the logic address X+3 KB to the data buffer block C, and moves the 4 KB data block starting from the logic address X+9 KB to the data buffer block B.

Optionally, the storage device 102 further provides the buffer unit to receive data obtained from the data buffer of the host 610 or data read from the NVM chip. The logic address accessed by the IO command may be different from the address of the buffer unit and may also be different from the address of the NVM chip.

Figure 7:
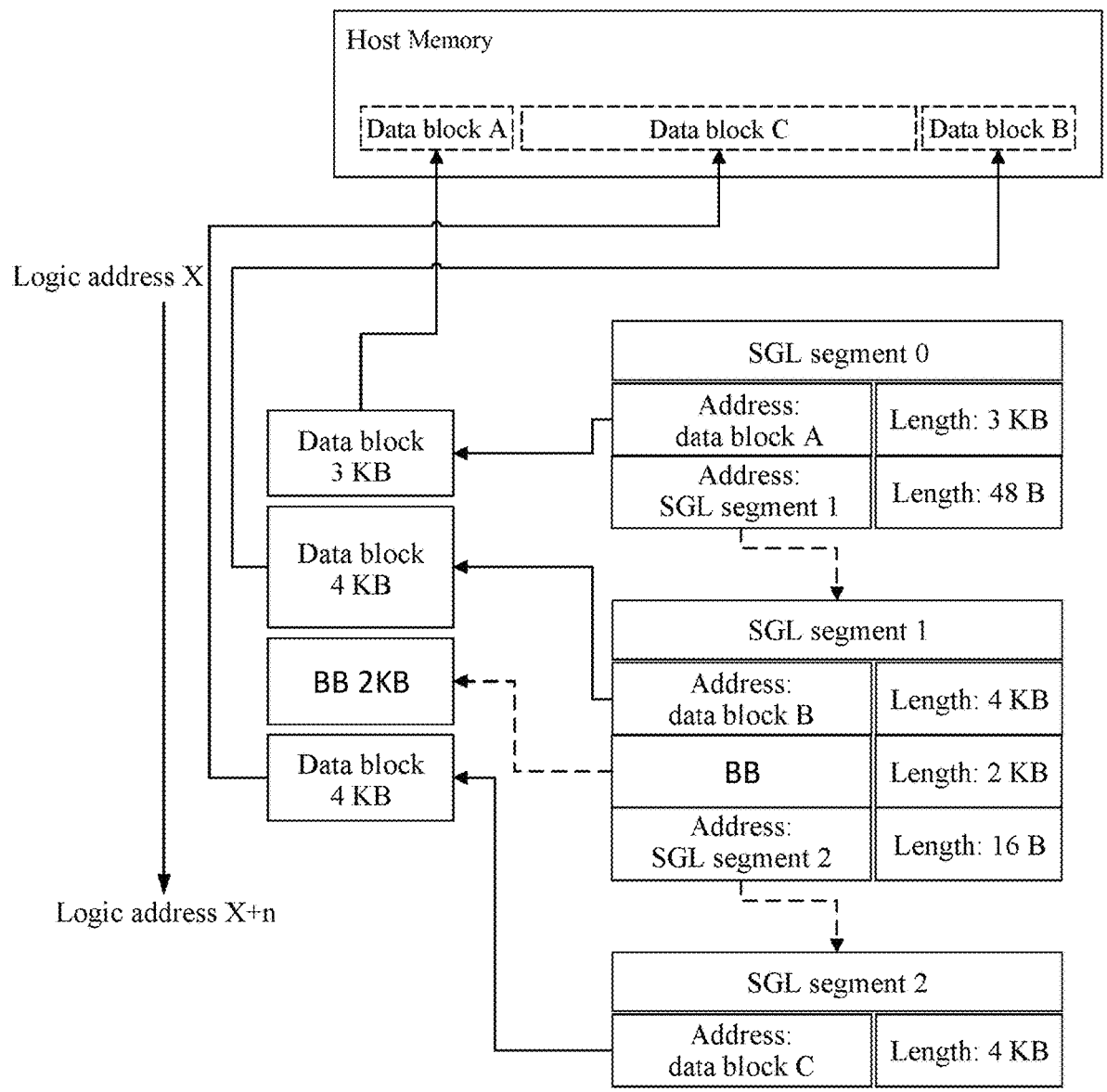
FIG. 7 shows the detailed schematic diagram of the SGL of the prior art.

FIG. 7 shows the detailed schematic diagram of the SGL of the prior art.

As an example, the IO command is the read command, and the SGL indicated by the IO command includes SGL segment 0, SGL segment 1, and SGL segment 2. The SGL segment 0 includes two descriptors, one of which indicates the address and length (3 KB) of the data block A of the host memory, and the other one of which indicates the address of the SGL segment 1, so that the storage device obtains the SGL segment 1 according to the SGL segment 0. The SGL segment 1 includes 3 descriptors, one of which indicates the address and length (4 KB) of the data block B of the host memory, the second one of which indicates the bit bucket and its length (2 KB), and the third one of which indicates the address of the SGL segment 2.

Each SGL segment of the SGL and each descriptor in the segment are linked in sequence; in addition to indicating the address of the host (the data block address or SGL segment address), these descriptors also imply the position in the logic address accessed by the IO command; each segment of the SGL and the descriptor thereof respectively correspond to the logic address range arranged in sequence in the logic address space accessed by the IO command. For example, the logic address range accessed by the IO command is marked as from the logic address x to the logic address X+n (the length is n=13 KB) (without the point X+n); the logic address range corresponding to the first descriptor of the SGL segment 0 is from x to x+3 KB, wherein the size of the range "3 KB" is also the length indicated by the descriptor; the logic address range corresponding to the first descriptor of the SGL segment 1 is from x+3 KB to X+7 KB, wherein the size of the range "4 KB(=7 KB-3 KB)" is also the length indicated by the descriptor; the logic address range corresponding to the second descriptor (the type is the bit bucket) of the SGL segment 1 is from x+7 KB to X+9 KB, and since the second descriptor is the bit bucket, the data of the logic address range corresponding thereto is not transmitted to the host.

Continuously referring to FIG. 7, the SGL segment 2 includes 1 descriptor, which indicates the address and length (4 KB) of the data block C of the host memory, and the corresponding logic address range is from x+9 KB to X+13 KB, wherein the size of the range is "4 KB(=13 KB-9 KB)".

The storage device obtains the SGL segment 0 from the hos according to the IO command (the read command), and extracts the descriptor in the SGL segment 0; according to the first descriptor, 3 KB data starting from the logic address X is moved to the data block A of the host memory, and the SGL segment 1 is obtained according to the second descriptor. The storage device further moves the 4 KB data starting from the logic address X+3 KB to the data block B of the host memory according to the first descriptor of the SGL segment 1, skips the 2 KB data starting from the logic address X+7 KB according to the second descriptor (the bit bucket) of the SGL segment 1 (the 2 KB data is not moved to the host memory), and obtains the SGL segment 2 according to the third descriptor. The storage device further moves the 4 KB data starting from the logic address X+9 KB to the data block C of the host memory according to the first descriptor of the SGL segment 2, and the SGL segment 1 further indicates that the SGL segment 2 is the last segment of the belonged SGL, so that the storage device knows that the processing of the belonged SGL is completed according to processing all the descriptors of the SGL segment 2, and also knows that the movement of the data of the IO command to which the SGL belongs is completed.

As can be seen that the SGL has a relatively complex structure (the variable number of segments and descriptors organized in the form of the linked list), and the data blocks described by the SGL are presented in the dispersed distribution status; the (target address) data block corresponding to each SGL descriptor has a size with a variable length, and also allows the (source address) logic address not to be continuous (through the bit bucket). Therefore, the SGL has relatively strong data expression capability, but at the same time, complexity is also brought to the analysis thereof. The control unit of the storage device needs to analyze the SGL when using the SGL for data transmission. When the data block associated with the specific logic address is to be transmitted, it needs to traverse the SGL to find the corresponding SGL descriptor to initiate data transmission, which reduces the data transmission efficiency. The SGL traversing complexity is generally O (N) (N is the length of the linked list or the number of the descriptors in the SGL); when the SGL is long, traversing the SGL also introduces a large processing delay, influencing the performance of the storage device to process the IO command.

According to the embodiment of the present application, the SGL is converted as the host space descriptor, to facilitate the addressing when transmitting the specific data block.

Figure 8:
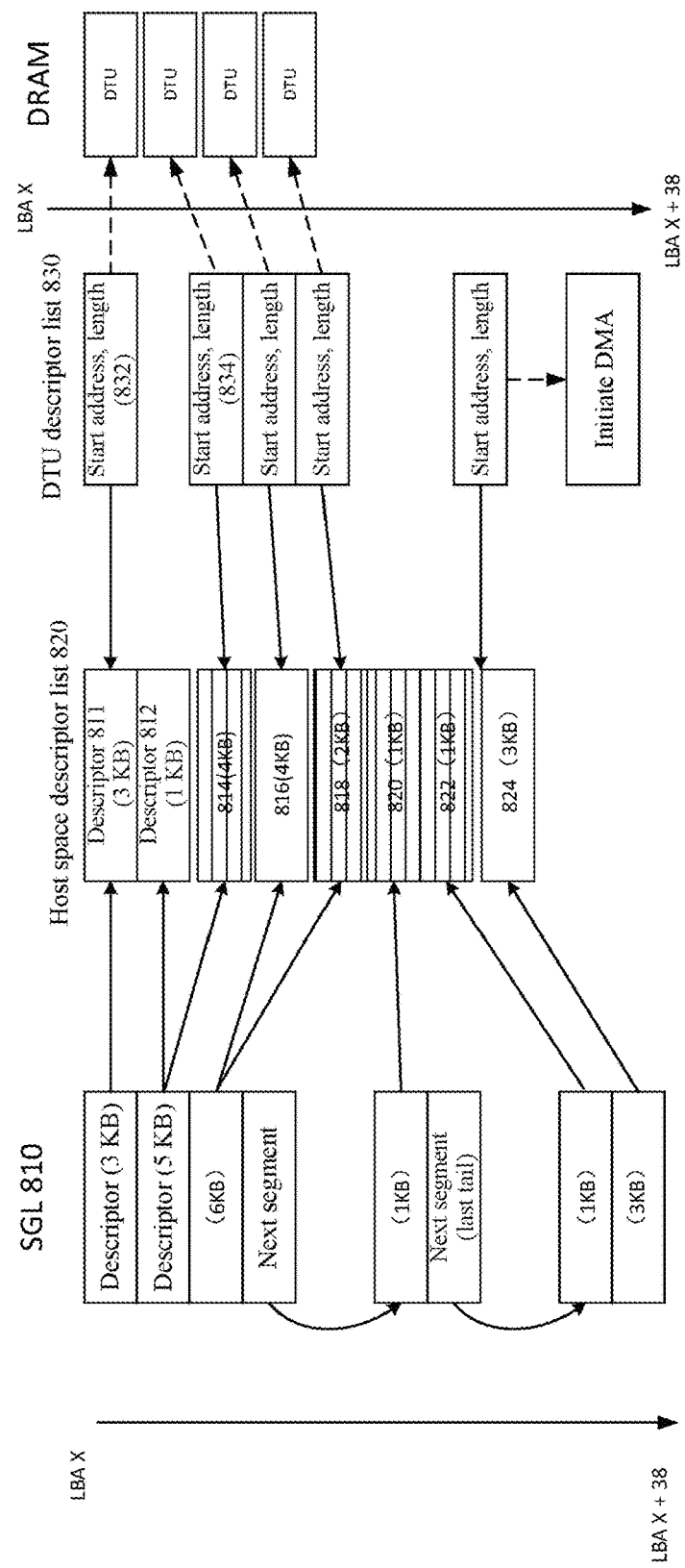
FIG. 8 shows the schematic diagram of the host space descriptor according to the embodiment of the present application.

FIG. 8 shows the schematic diagram of the host space descriptor according to the embodiment of the present application.

The SGL 810 is the SGL obtained according to the IO command to be processed. The SGL includes segments and SGL descriptors linked in sequence. The SGL descriptors indicating the SGL data block are associated to the continuous logic address space accessed by the IO command in sequence. FIG. 8 shows LBA X to LBA X+38, representing 38 storage units in the LBA space, while SGL 810 describes the data block of 19 KB, so that the size of each storage unit of the each LBA space is 512 bytes. According to the position of the SGL descriptor in the SGL, the LBA space associated therewith is determined and the SGL descriptor records the data block address and length of the host memory.

The host space descriptor list 820 includes the host space descriptors (811, 812, . . . 824). The multiple host space descriptors included in the host space descriptor list 820 are also linked in sequence. Each host space descriptor itself has the same specific size and records the data block address and length of the host memory. The host space descriptors and the SGL descriptor are in a multiple-to-one relation; according to the SGL descriptor, one or more host space descriptors are generated.

The host space descriptors are divided into multiple groups. Each group includes one or more host space descriptors. With reference to FIG. 8, the host space descriptors (811 and 812) are divided into one group; the host space descriptor (814) is separately divided into one group; the host space descriptor (816) is separately divided into one group; the host space descriptors (818, 820, and 822) are divided into one group; the host space descriptor (824) is separately divided into one group. The size of the host memory space described by each group of multiple the host space descriptors has the specific length. according to the example of the present application, the specific length is, for example, 4 KB, and 4 KB is called as one Data Transfer Unit (DTU); when the storage device processes the IO command, the control unit thereof takes the DTU as the unit to initiate data transmission.

The host space descriptor (824) corresponds to the last SGL descriptor of the SGL 810, and is also the last group of host space descriptors in the host space descriptor list 820. The size of the host memory space described by the last group of host space descriptors may be less than one DTU length.

The DTU descriptor list 830 includes one or more DTU descriptors. Each DTU itself has the same size and includes the address and length indexing the host space descriptor. Since the host space descriptor has the specific size (for example, 8 bytes), the length recorded by the DTU descriptor also indicates the number of the corresponding host space descriptors (for example, the length recorded by the DTU descriptor is 16, and it is implied that 2=16/8 host space descriptors). The DTU descriptor indicates one group of host space descriptors represent one DTU; the address of the DTU descriptor indexing the host space descriptor is the start address of the first host space descriptor of the groups of host space descriptors; in the range from the start address to the length recorded by the DTU descriptor, all the host space descriptors in the group are stored Hence, the DTU descriptor 832 indicates the group formed by the host space descriptors (811 and 812); the DTU descriptor 834 indicates the group formed by the host space descriptor (814); the rest may be deduced by analogy.

Each DTU descriptor is further associated with the DTU buffered for the IO command in the DRAM. For the read command, the buffered DTU is the data block read from the NVM chip; for the write command, the buffered DTU is the data block received from the host. Optionally, the DTU descriptors in the DTU descriptor list 830 are ordered, so that the position of the DTU descriptor in the DTU descriptor list 830 implies the position of the data of the DTU corresponding thereto in the logic address range accessed by the IO command. The DTU descriptors in the DTU descriptor list 830 are associated to the continuous logic address space accessed by the IO command in sequence. FIG. 8 shows LBA X to LBA X+38 (not including the point X+38), representing 38 storage units in the LBA space. Hence, according to the position of the DTU descriptor in the DTU descriptor list, the LBA space associated therewith is determined. Moreover, according to the LBA space to be accessed, the position of the corresponding DTU descriptor in the DTU descriptor list is also directly determined. Still optionally, each of the DTU descriptors in the DTU descriptor list 830 does not need to be ordered; moreover, the DTU descriptor further records the position of the data of the DTU corresponding thereto in the logic address range accessed by the IO command.

The SGL 810, the host space descriptor list 820, and the DTU descriptor list 830 each describe the data transmission needed by the same IO command.

Hence, to process the IO command, for example, the read command, one or more OTU belonging to the command are transmitted to the data buffer block of the host memory described by the SGL of the read command. The control unit of the storage device controls the data transmission process according to the DTU descriptor list 830. For example, one of the DTU descriptors is obtained from the DTU descriptor list 830; the DTU descriptor indicates the storage position of the DTU in the DRAM of the storage device. The control unit further obtains the corresponding group of host space descriptors according to the DTU descriptor; the group of host space descriptors together describes the data buffer block of the host memory equal to the DTU size. The control unit initiates, according to each of the group of host space descriptors, the DMA transmission from the DTU of the DRAM of the storage device to the host memory address and length indicated by the host space descriptor. The control unit repeats the data transmission process above according to all DTU descriptors in the DTU descriptor list, to complete the processing of the read command.

If the IO command is the write command, the control unit further obtains, according to each DTU descriptor in the DTU descriptor list, the corresponding group of host space descriptors, and according to each host space descriptor of the group, initiates the data transmission from the host memory to the DTU of the DRAM.

Hence, according to the embodiment of the present application, the host space descriptor list 820 and the DTU descriptor list 830 are first generated according to the IO command; then the host space descriptor is obtained according to the DTU descriptor list 830, and the DMA transmission is initiated. According to the DTU descriptor, the host space descriptor is directly obtained to initiate the DMA transmission, which omits the process of traversing the SGL. Moreover, when the control unit uses multiple processing units to process multiple IO commands in parallel, the process of generating the host space descriptor list and the DTU descriptor list for each IO command according to the SGL thereof occurs in the same host data transmission process for other IO commands, so that the process of generating the host space descriptor list and the DTU descriptor list is hidden, to further improve the efficiency of the processing the IO commands.

To generate the host space descriptor list 820, optionally, also referring to FIG. 8, the 3 KB host memory space indicated by the first SGL descriptor plus the front 1 KB host memory space indicated by the second SGL descriptor of the SGL constitutes the 4 KB host memory space equal to the DTU size, and therefore, two host space descriptors are generated to be added to the host space descriptor list. Furthermore, according to the start positions of the two the host space descriptor s in the host space descriptor list 820 and the number of the two the host space descriptors (2), the DTU descriptor is generated and the generated DTU descriptor is added to the DTU descriptor list 830. In a similar fashion, the remaining all SGL descriptors are all divided into the host space descriptor groups representing the host memory space with the size of 4 K, and are stored in the host memory descriptor list 820.

Figure 9:
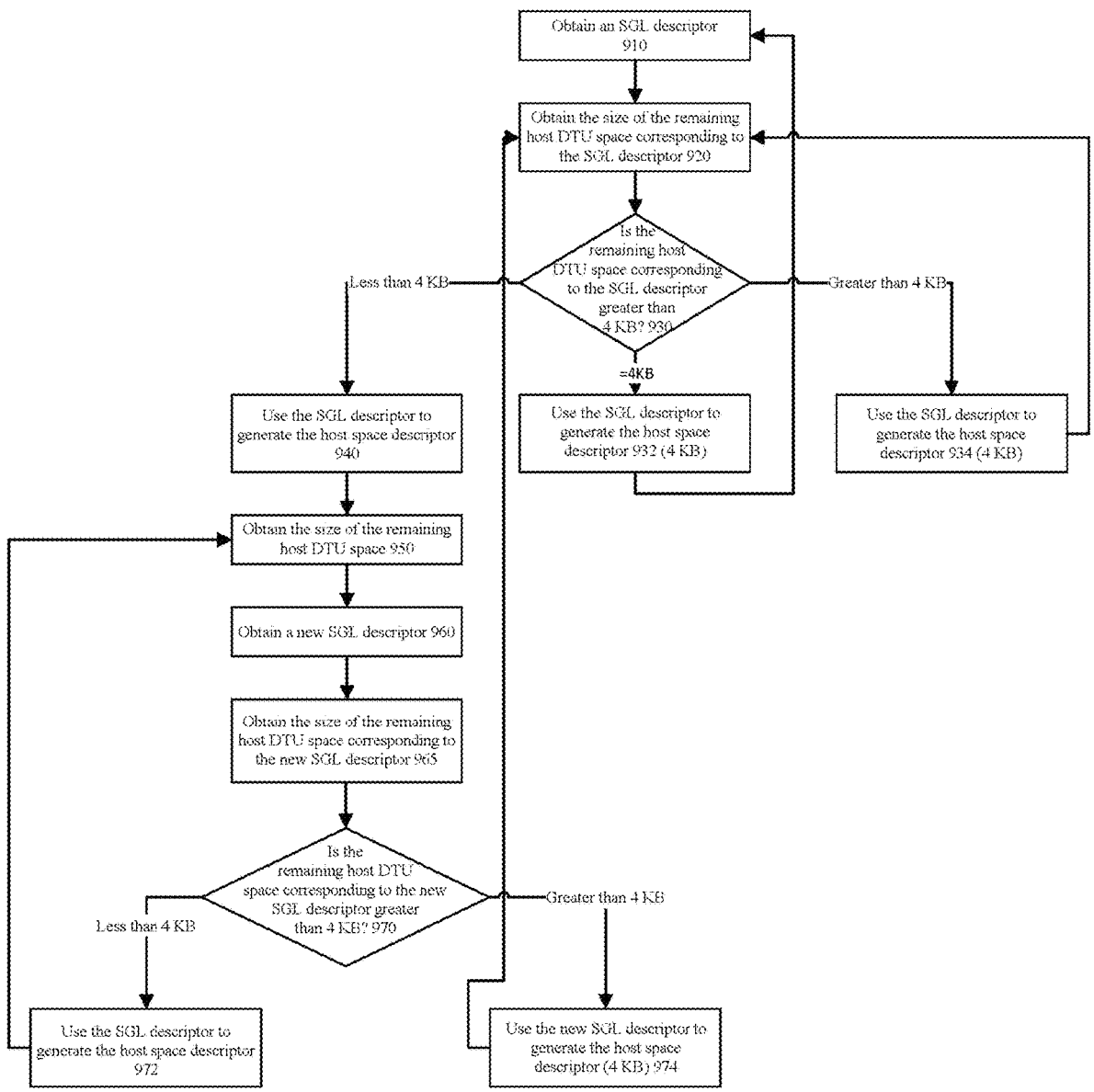
FIG. 9 shows the flow chart of generating the host space descriptor list according to the embodiment of the present application.

FIG. 9 shows the flow chart of generating the host space descriptor list according to the embodiment of the present application.

The host space descriptor is generated according to the SGL of each IO command.

The SGL descriptor is obtained from the SGL (for example, 1) (910). The obtained SGL descriptor type is the descriptor describing the host memory data block; for the purpose of simplicity, "SGL descriptor" is used in the embodiment of FIG. 9 to represent the descriptor for describing the memory data block. The obtained SGL descriptor indicates the size of the host memory data block. The SGL descriptors are obtained in sequence from front to back by traversing the SGL.

The size of the remaining host DTU space corresponding to the SGL descriptor obtained in step 910 is obtained (920). According to the embodiment of the present application, the host DTU space refers to the host memory needed for transmitting the specific DTU, and the size thereof is the same as the same DTU (for example, 4 KB). The remaining host DTU space refers to the host memory space that are not yet described by the host space descriptor after generating zero, one, or more host space descriptors for the host DTU space. In the initial case, the size of the remaining host DTU space corresponding to the specific DTU is the size of the DTU. Hence, in the example of FIG. 9, the size of the remaining host DTU space obtained by first executing step 920 is 4 KB. The size of "the remaining host DTU space corresponding to the SGL descriptor" is the part of the SGL descriptor that can be used for filling the "remaining host DTU space" in the host memory space which is not yet described by the host space descriptor generated thereby.

The relation between the remaining host DTU space corresponding to the SGL descriptor obtained in step 920 and the DTU size (for example, 4 KB) is compared (930).

In step 930, if the size of the remaining host DTU space corresponding to the SGL descriptor is less than the size of the DTU (4 KB), according to the SGL descriptor, the host space descriptor is generated (940), wherein the generated host space descriptor indicates all the remaining host DTU spaces corresponding to the SGL descriptor, that is, all the remaining host memory space of the SGL descriptor that is not yet described by the host space descriptor generated thereby. The generated host space descriptor is added to the tail of the host space descriptor list.

In step 930, if the size of the remaining host DTU space corresponding to the SGL descriptor is equal to the size of the DTU (4 KB), according to the SGL descriptor, the host space descriptor is generated (932), wherein the generated host space descriptor indicates the host memory space equal to the size of the DTU. The generated host space descriptor is added to the tail of the host space descriptor list.

Accordingly, the remaining host DTU space becomes 0; next, the host space descriptor is generated for the next host DTU space size, so as to return to step 910.

In step 930, if the size of the remaining host DTU space corresponding to the SGL descriptor is greater than the size of the DTU (4 KB), according to the SGL descriptor, the host space descriptor is generated (934), wherein the generated host space descriptor indicates the host memory space equal to the size of the DTU. The generated host space descriptor is added to the tail of the host space descriptor list. Accordingly, the remaining host DTU space becomes 0; next, the host space descriptor is generated for the next host DTU space size, while the SGL descriptor still has the host memory space that is not yet described by the generated host space descriptor, so as to return to step 920; for the (next)

new host DTU space size, the size of the remaining host DTU space corresponding to the SGL descriptor is obtained. If the IO command no longer needs a complete next host DTU space size, all the remaining spaces needed by the IO command are used as the next host DTU space size. If the remaining space needed by the IO command is 0, the processing procedure of FIG. 9 ends.

Continuously referring to step 940, since in step 940, the host memory space described by the SGL descriptor is completely used for generating the host space descriptor, while the current host DTU space is not completely distributed yet (greater than 0), the size of the currently remaining host DTU space is obtained (950). The new SGL descriptor is obtained (960). The size of the remaining host DTU space corresponding to the new SGL descriptor obtained in step 960 is obtained (965).

The relation between the remaining host DTU space corresponding to the new SGL descriptor obtained in step 965 and the DTU size (for example, 4 KB) is compared.

If the size of the remaining host DTU space corresponding to the SGL descriptor is less than the size of the DTU (4 KB), according to the SGL descriptor, the host space descriptor is generated (972), wherein the generated host space descriptor indicates all the remaining host DTU space corresponding to the new SGL descriptor, that is, all the remaining host memory space of the new SGL descriptor that is not yet described by the host space descriptor generated thereby. The generated host space descriptor is added to the tail of the host space descriptor list.

Since in step 972, the host memory space described by the new SGL descriptor is completely used for generating the host space descriptor, while the current host DTU space is not completely distributed yet (the size of the currently remaining host DTU space is greater than 0), return to step 950, and continue the processing.

In step 970, if the size of the remaining host DTU space corresponding to the SGL descriptor is equal to the size of the DTU (4 KB), according to the SGL descriptor, the host space descriptor is generated (not shown in FIG. 9), wherein the generated host space descriptor indicates the host memory space equal to the size of the DTU. The generated host space descriptor is added to the tail of the host space descriptor list. Accordingly, the remaining host DTU space becomes 0; next, the host space descriptor is generated for the next host DTU space size, so as to return to step 910.

In step 970, if the size of the remaining host DTU space corresponding to the SGL descriptor is greater than the size of the DTU (4 KB), according to the SGL descriptor, the host space descriptor is generated (974), wherein the generated host space descriptor indicates the host memory space equal to the size of the DTU. The generated host space descriptor is added to the tail of the host space descriptor list. Accordingly, the remaining host DTU space becomes 0; next, the host space descriptor is generated for the next host DTU space size, while the SGL descriptor still has the host memory space that is not yet described by the generated host space descriptor, so as to return to step 920; for the (next) new host DTU space size, the size of the remaining host DTU space corresponding to the SGL descriptor is obtained. If the IO command no longer needs 4 KB size, all the remaining spaces needed by the IO command are used as the next host DTU space size. If the remaining space needed by the IO command is 0, the processing procedure of FIG. 9 ends.

The DTU descriptor list is generated according to the host space descriptor list generated according to the IO command. The host space descriptor list is traversed from front to back; every time when obtaining one or more host space descriptors with the size of the corresponding host memory being equal to the size of the DTU (for example, 4 KB), the one or more host space descriptors are grouped, and the DTU descriptor is generated for the group, wherein the generated DTU descriptor points to the first of the group of host space descriptors, and the DTU descriptor further records the number of the group of host space descriptors or the length of the occupied storage space. Moreover, the DTU descriptors generated in sequence are added to the DTU descriptor list. The DTU descriptor is further associated with the DTU in the memory buffering the data accessed by the IO command. The DTU descriptor is further associated with the logic address space having the DTU size and accessed by the IO command. Optionally, the DTU descriptors in the DTU descriptor list correspond in sequence to the logic address spaces having the DTU size from front to back in the logic address range and accessed by the IO command.

Optionally, the one or more SGL descriptor types obtained from the SGL represent the bit bucket; the data of the logic address space corresponding thereto would not need to be transmitted between the host and the storage device. In the embodiment of the present application, also referring to FIG. 9, the description substantially the same as that for processing the descriptor for describing the memory data block is used for processing the descriptor for describing the bit bucket, and when generating the host space descriptor according to the type of SGL descriptors, the bit bucket mark is marked in the generated host space descriptor. Hence, when the one or more host space descriptor obtained according to the DTU descriptor have the bit bucket mark, the DMA transmission from the host to the storage device is not initiated according to such a host space descriptor.

Figure 10:
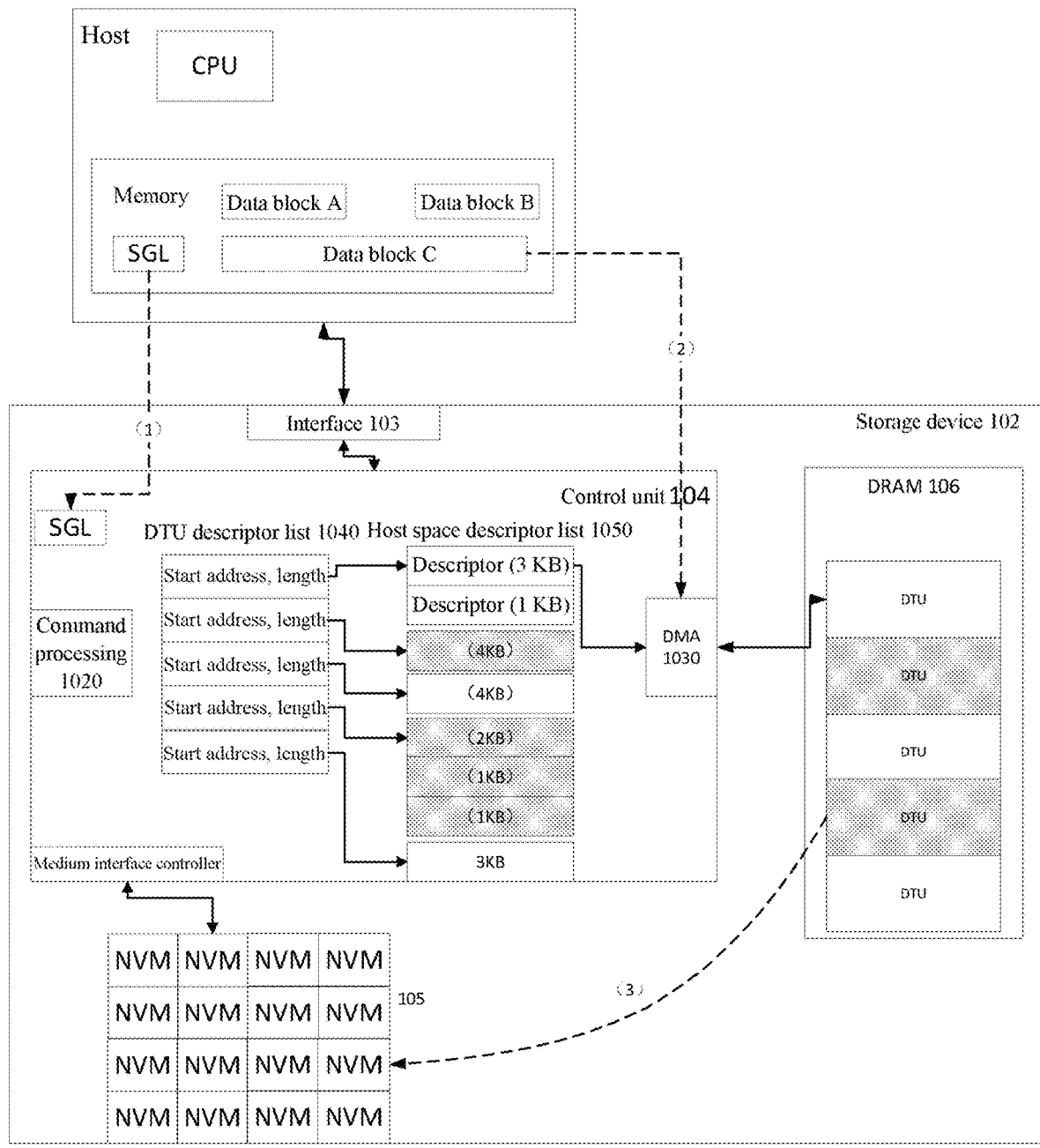
FIG. 10 shows the schematic diagram of processing the write command according to the embodiment of the present application.

FIG. 10 shows the schematic diagram of processing the write command according to the embodiment of the present application.

The host including the CPU and the memory are coupled to the storage device 102, and provides the write command to the storage device 102. The host also sets the SGL corresponding to the write command in its own memory, and further stores data written into the storage device in the plurality of data blocks (data block A, data block B, and data block C) of the memory. The SGL describes the start addresses and lengths of the multiple data blocks of the host memory.

The control unit 104 obtains the IO command; the command processing unit 1020 obtains the SGL (indicated by mark "(1)" in FIG. 10) according to the IO command (for example, the SGL shown in FIG. 8); the SGL of the host memory is moved into the control unit 104. Optionally, the SGL is moved to the DRAM 106.

The command processing unit 1020 generates the host space descriptor list 1050 and DTU descriptor list 1040 according to the obtained SGL. For example, the command processing unit 1020 generates the host space descriptor list 1050 and DTU descriptor list 1040 according to the processing procedure shown in FIG. 9. The generated host space descriptor list 1050 includes multiple groups. Each group of host space descriptor lists in FIG. 10 are distinguished by different background patterns and indicate the host memory space corresponding to the DTU size (4 KB). Each DTU descriptor indicates the start address of one group of host space descriptors. The generated host space descriptor list 1050 and DTU descriptor list 1040 are recorded in the memory inside the control unit 104 or stored in the DRAM 106.

The command processing unit 1020 obtains, according to the DTU descriptor in the DTU descriptor list 1040, the corresponding group of host space descriptors, and according to each host space descriptor of the group, operates the DMA unit 1030 to move data from the data block of the host memory to the DTU in the DRAM 106 (indicated by mark "(2)" in FIG. 10).

The command processing unit 1020 further moves the DTU in the DRAM 106 to the NVM chip 105 (indicated by mark "(3)" in FIG. 10) through the medium interface controller.

Figure 11:
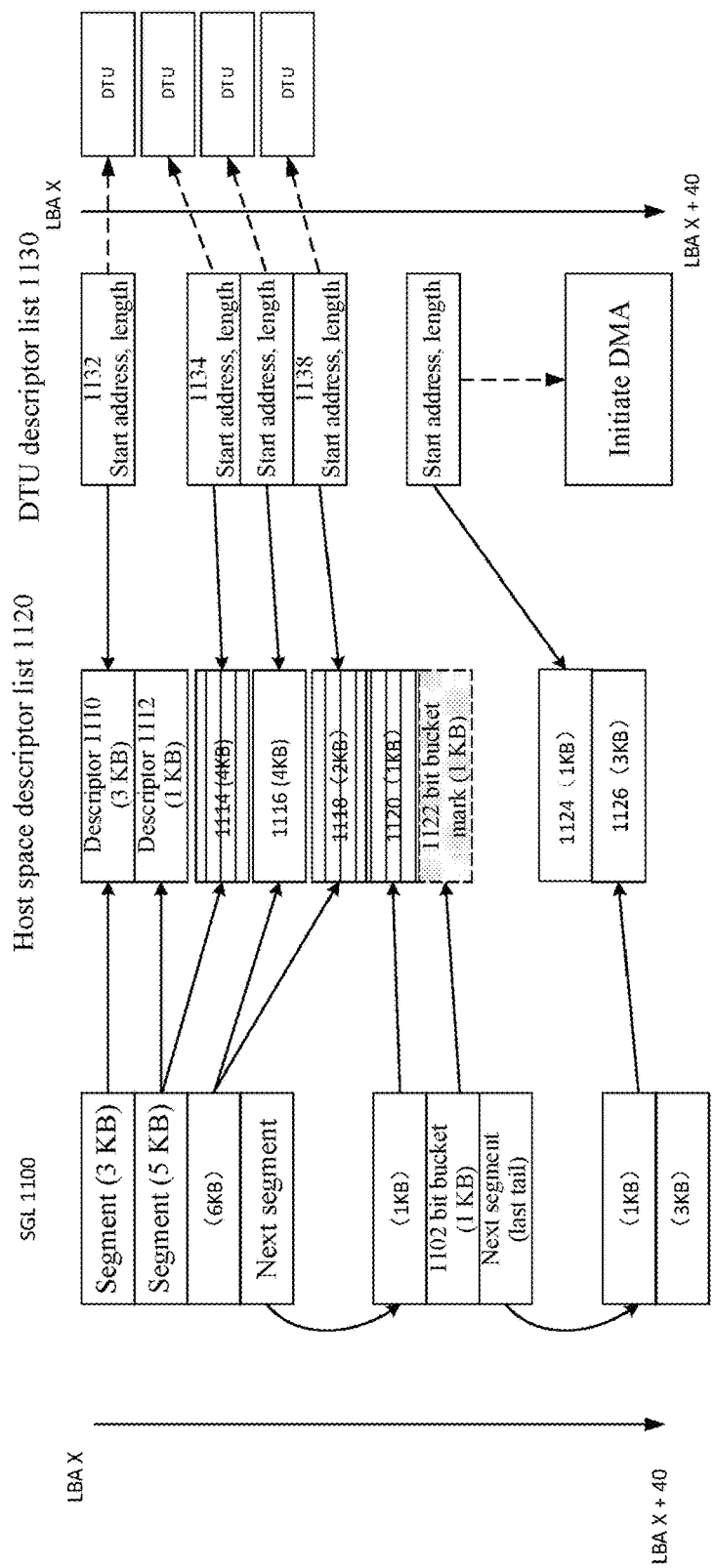
FIG. 11 shows the schematic diagram of the host space descriptor according to another embodiment of the present application.

FIG. 11 shows the schematic diagram of the host space descriptor according to another embodiment of the present application.

The SGL 1100 is the SGL obtained according to the IO command to be processed. The SGL descriptors of the SGL are associated to the continuous logic address space accessed by the IO command in sequence. FIG. 11 shows LBA X to LBA X+40 (not including point X+40), representing 40 storage units in the LBA space, while SGL 1110 describes the data block of 20 KB. According to the position of the SGL data block descriptor in the SGL, the LBA space associated therewith is determined and the SGL data block descriptor records the data block address and length of the host memory. The type of the SGL descriptor 1102 is the bit bucket, and the length indicated thereby is 1 KB, representing that the data of the corresponding logic address range does not need to be transmitted to the same host.

The host space descriptor list 1120 includes multiple host space descriptors. Particularly, the host space descriptor 1122 has the bit bucket mark; the bit bucket mark occupies the position for recording the host memory address by the host space descriptor 1122, so that the host space descriptor 1122 has the same size as other host space descriptors.

The host space descriptors are divided into multiple groups. With reference to FIG. 11, the host space descriptors (1110 and 1112) are divided into one group; the host space descriptor (1114) is separately divided into one group; the host space descriptor (1116) is separately divided into one group; the host space descriptors (1118, 1120, and 1122) are divided into one group; the host space descriptors (1124 and 1126) are divided into one group. The size of the host memory space described by each group of multiple the host space descriptors has the specific length. In the example of the present application, the specific length is, for example, 4 KB.

The DTU descriptor list 1130 includes one or more DTU descriptors. Each DTU itself has the same size and includes the address and length indexing the host space descriptor.

Hence, the DTU descriptor 1132 indicates the group formed by the host space descriptors (1110 and 1112); the DTU descriptor 1134 indicates the group formed by the host space descriptor (1114); the rest may be deduced by analogy. The DTU descriptor 1138 indicates the group formed by the host space descriptors (1118, 1120, and 1122), wherein the host space descriptor 1122 has the bit bucket mark (BB), which indicates that the length is 1 KB, but does not have the host memory address.

Each DTU descriptor is further associated with the DTU buffered for the IO command in the DRAM. The DTU descriptors in the DTU descriptor list 1130 are associated to the continuous logic address space accessed by the IO command in sequence. FIG. 11 shows LBA X to LBA X+40, representing 40 storage units in the LBA space.

The SGL 1100, the host space descriptor list 1120, and the DTU descriptor list 1130 each describe the data transmission needed by the same 10 command.

Hence, to process the IO command, for example, the read command, one or more OTU belonging to the command are transmitted to the data buffer block of the host memory described by the SGL of the read command. The control unit of the storage device controls the data transmission process according to the DTU descriptor list 1130.

If the IO command is the write command, the control unit further obtains, according to each DTU descriptor in the DTU descriptor list, the corresponding group of host space descriptors, and according to that host space descriptor of the group, initiates the data transmission from the host memory to the DTU of the DRAM.

When the control unit obtains the host space descriptor 1122, it is recognized that it has the bit bucket mark, and therefore, the DMA transmission is not initiated according to the host space descriptor 1122. In the example of FIG. 11, the host space descriptor 1122 is the last host space descriptor in the host space descriptor group wherein it is located, and therefore, the control unit directly omits the host space descriptor 1122. When the host space descriptor 1122 is not the last host space descriptor in the host space descriptor group wherein it is located, the control unit would further determine the logic address range needing to be skipped or DTU range in the DRAM according to the host space descriptor 1122 indicating the bit bucket for processing the next host space descriptor, so as to obtain the logic address range corresponding to the next host space descriptor or the DTU range in the DRAM.

Figure 12:
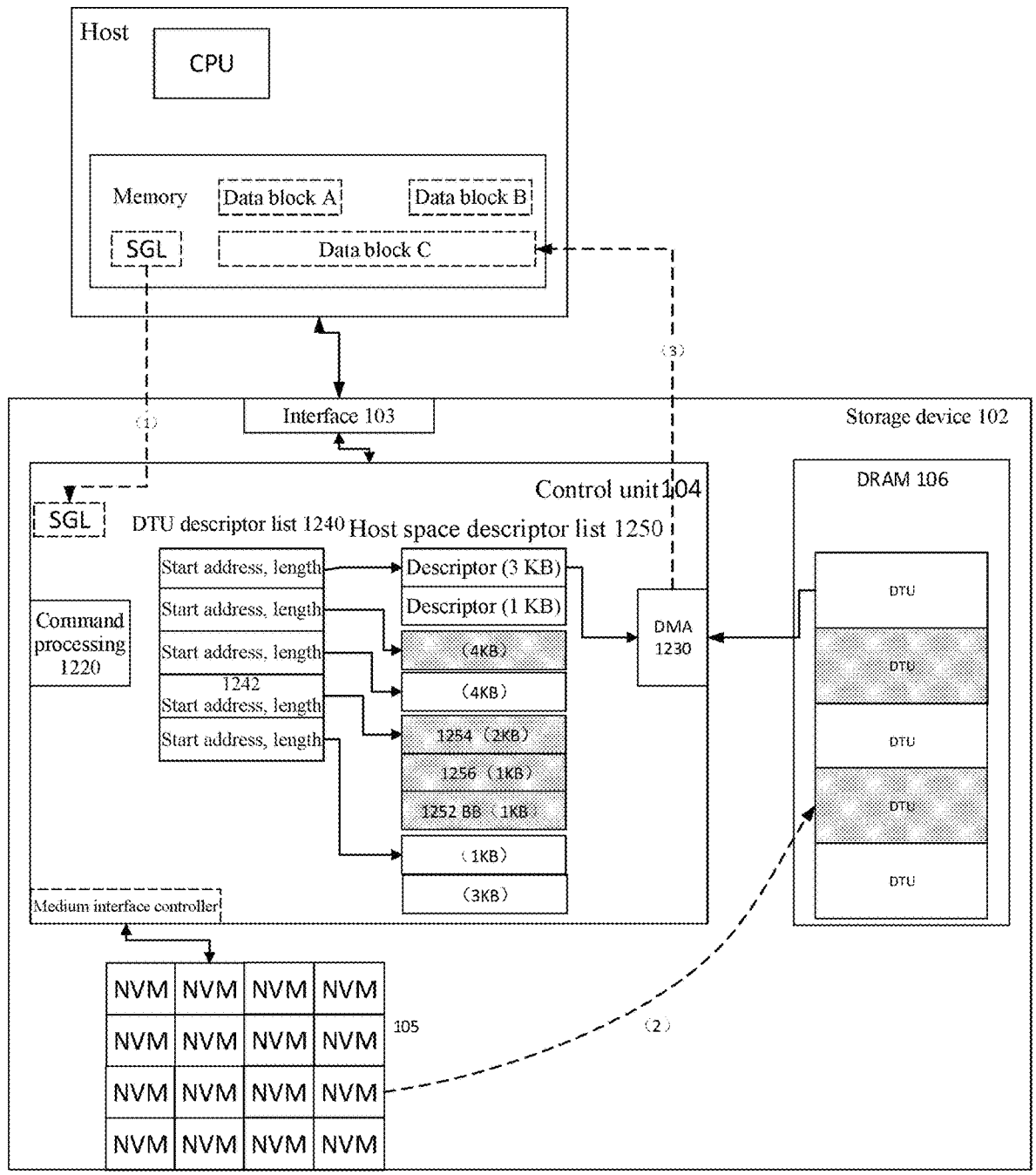
FIG. 12 shows the schematic diagram of processing the read command according to the embodiment of the present application.

FIG. 12 shows the schematic diagram of processing the read command according to the embodiment of the present application.

The host including the CPU and the memory are coupled to the storage device 102, and provides the read command to the storage device 102. The host also sets the SGL corresponding to the read command in its own memory, and further prepares the plurality of data blocks (data block A, data block B, and data block C) in the memory for receiving data to be read by the read command. The SGL describes the start addresses and lengths of the multiple data blocks of the host memory.

The control unit 104 obtains the read command; the command processing unit 1220 obtains the SGL (indicated by mark "(1)" in FIG. 12) according to the IO command (for example, the SGL shown in FIG. 11); the SGL of the host memory is moved into the control unit 104. Optionally, the SGL is moved to the DRAM 106.

The command processing unit 1220 generates the host space descriptor list 1250 and DTU descriptor list 1240 according to the obtained SGL. The generated host space descriptor list 1250 includes multiple groups. Each group of host space descriptor lists in FIG. 12 are distinguished by different background patterns and indicate the host memory space corresponding to the DTU size (4 KB). The host space descriptor 1252 in the host space descriptor list 1250 has the bit bucket mark (BB), which indicates that the corresponding 1 KB logic address range or the 1 KB partial data of the DTU stored in the DRAM do not need to be transmitted to the host.

The command processing unit 1220 reads the data and moves to the plurality of DTUs in the DRAM 106 (indicated by mark "(2)" in FIG. 12) through the medium interface controller according to the logic address range accessed by the read command.

The command processing unit 1220 further obtains, according to the DTU descriptor in the DTU descriptor list 1240, the corresponding group of host space descriptors, and according to each host space descriptor of the group, operates the DMA unit 1230 to move data from the DTU in the DRAM 106 to the data block (indicated by mark "(3)" in FIG. 12) of the host memory. The command processing unit 1220 would not transmit the data of the 1 KB logic address range corresponding thereto to the host in response to obtaining the host space descriptor 1252 with the bit bucket mark (BB).

According to the embodiment of the present application, if the command processing unit 1220 needs to transmit the DTU in the DRAM indicated by the DTU descriptor 1220 to the host memory, through the address and length of the host space descriptor recorded by the DTU descriptor 1220, corresponding 3 host space descriptors (1254, 1256, and 1252) are obtained from the host space descriptor list 1250.

Optionally, each DTU descriptor in the DTU descriptor list 1240 is continuously stored, so as to directly determine the DTU descriptor corresponding thereto according to the logic address range of the DTU to be transmitted. Each host space descriptor in the host space descriptor list 1250 is also continuously stored. Hence, when, for example, the fourth DTU is to transmit the IO command, according to the number 4, the storage position of the DTU descriptor 1242 is determined and the DTU descriptor 1242 is obtained.

According to the DTU descriptor 1242, 3 host space descriptors are obtained, and according to the host memory address and length recorded by each host space descriptor, the transmission from the fourth DTU to the host is initiated. The host space descriptor 1252 has the bit bucket mark.

Hence, according to the 3 host space descriptors of the fourth DTU corresponding to the IO command, two data transmissions from the DRAM to the host memory are initiated. At the first time, the front 2 KB data of the fourth DTU is transmitted to the host memory address indicated by the host space descriptor 1254, and at the second time, the data of the 1 KB length with the relative start address offset of the fourth DTU starting from 2 KB is transmitted to the host memory address indicated by the host space descriptor 1256.

Hence, according to the embodiment of the present application, it avoids the complex operation of finding the host memory address only by needing to traverse the SGL for each DMA transmission, improves the data transmission efficiency, and accelerates the IO command processing speed.

The above-mentioned contents are merely specific implementations of the present application; however, the protection scope of the present application is not limited thereto. Any change or replacement that could be easily conceived of by a person skilled in the technical field in the technical scope disclosed in the present application should be covered in the protection scope of the present application. Therefore, the protection scope of the present application shall be subject to the protection scopes of the claims.

What is claimed is:

1. An SGL processing acceleration method, comprising:
    obtaining an SGL associated with an IO command;
    generating a host space descriptor list and a DTU descriptor list according to the SGL;
    obtaining one or more host space descriptors of the host space descriptor list according to a DTU descriptor of the DTU descriptor list; and
    initiating a data transmission according to the obtained one or more host space descriptors.

2. The SGL processing acceleration method according to claim 1, wherein the host space descriptor list comprises a plurality of host space descriptors; and each of the plurality of host space descriptors records a host memory address and a length, and has a same size.

3. The SGL processing acceleration method according to claim 2, wherein
    the plurality of host space descriptors of the host space descriptor list are divided into a plurality of groups; the DTU descriptor of the DTU descriptor list indexes a group of host space descriptors; and a sum of the lengths recorded by all host space descriptors of the group of host space descriptors is equal to the length of the DTU.

4. The SGL processing acceleration method according to claim 3, wherein
    according to one or more consecutive SGL descriptors in the SGL, generating the group of host space descriptors, wherein a size of a host memory space indicated by the one or more consecutive SGL descriptors is greater than or equal to the length of the DTU; and
    if the size of the host memory space indicated by the one or more consecutive SGL descriptors is greater than the length of the DTU, dividing the host memory space indicated by a last SGL descriptor of the one or more consecutive SGL descriptors, so that the size of the host memory space indicated by the one or more consecutive SGL descriptors is equal to the length of the DTU.

5. The SGL processing acceleration method according to claim 1, wherein the DTU descriptor list comprises a plurality of DTU descriptors; and each of the plurality of DTU descriptors records a host space descriptor address and number, and has a same size.

6. The SGL processing acceleration method according to claim 1, wherein
    traversing the host space descriptor list from front to back; every time when obtaining one or more host space descriptors with the size of the corresponding host memory being equal to the size of the DTU, grouping the one or more host space descriptors, and generating a DTU descriptor for the group, wherein the generated DTU descriptor records an address of a first host space descriptor of the group of host space descriptors, and the DTU descriptor further records the number of the group of host space descriptors or the length of the occupied storage space.

7. The SGL processing acceleration method according to claim 1, wherein
    if one or more SGL descriptors in the SGL indicates a bit bucket, setting a bit bucket mark in the host space descriptor generated according to the one or more SGL descriptors.

8. The SGL processing acceleration method according to claim 1, wherein
    if the one or more host space descriptors of the host space descriptor list obtained according to the DTU descriptor of the DTU descriptor list have a bit bucket mark, not initiating the data transmission according to each obtained host space descriptor with the bit bucket mark.

9. The SGL processing acceleration method according to claim 1, wherein
    operating a DMA unit to initiate the data transmission according to the obtained host space descriptor, wherein
    the host memory address indicated by the host space descriptor is used as an end of the data transmission, while a DTU corresponding to the DTU descriptor indexing the host space descriptor is used as an end of the data transmission.

10. A storage device, comprising a control unit and a nonvolatile storage medium, wherein the control unit performs the method according to claim 1.

* * * * *